US012694130B1

(12) United States Patent
White

(10) Patent No.: US 12,694,130 B1
(45) Date of Patent: Jul. 28, 2026

(54) SYSTEMS AND METHODS FOR A SANITIZED CODE SCANNING REPORT

(71) Applicant: Truist Bank, Charlotte, NC (US)

(72) Inventor: Brian Matthew White, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 19/382,464

(22) Filed: Nov. 7, 2025

(51) Int. Cl.
G06F 21/57 (2013.01)

(52) U.S. Cl.
CPC ...... G06F 21/577 (2013.01); G06F 2221/033 (2013.01)

(58) Field of Classification Search
None
See application file for complete search history.

(56) References Cited

U.S. PATENT DOCUMENTS

2016/0182558 A1 * 6/2016 Tripp .................... G06F 21/562
726/25

* cited by examiner

*Primary Examiner* — Brandon Hoffman
(74) *Attorney, Agent, or Firm* — Jordan IP Law LLC; Michael A. Springs, Esq.

(57) ABSTRACT

A method, computer program product, and computer system for receiving, by a computing device, an indication that a software component is to be released for delivery to a customer. A predefined and non-modifiable industry-standard security profile may be selected defining one or more security scans to be executed in accordance with at least one of an application-security framework and a secure-development standard. The one or more security scans may be executed against the software component using the predefined and non-modifiable industry-standard security profile to identify one or more vulnerabilities. It may be determined that the one or more vulnerabilities that exceeds a remediation threshold has been remediated. A certification report may be generated that includes a sanitized summary of the one or more security-scans results that omits source code, configuration data, and raw vulnerability details from results of the one or more security scan in response to determining that the one or more vulnerabilities that exceeds the remediation threshold has been remediated. The certification report with the sanitized summary may be transmitted to the customer to evidence compliance of the software component with the predefined industry-standard security profile.

20 Claims, 7 Drawing Sheets

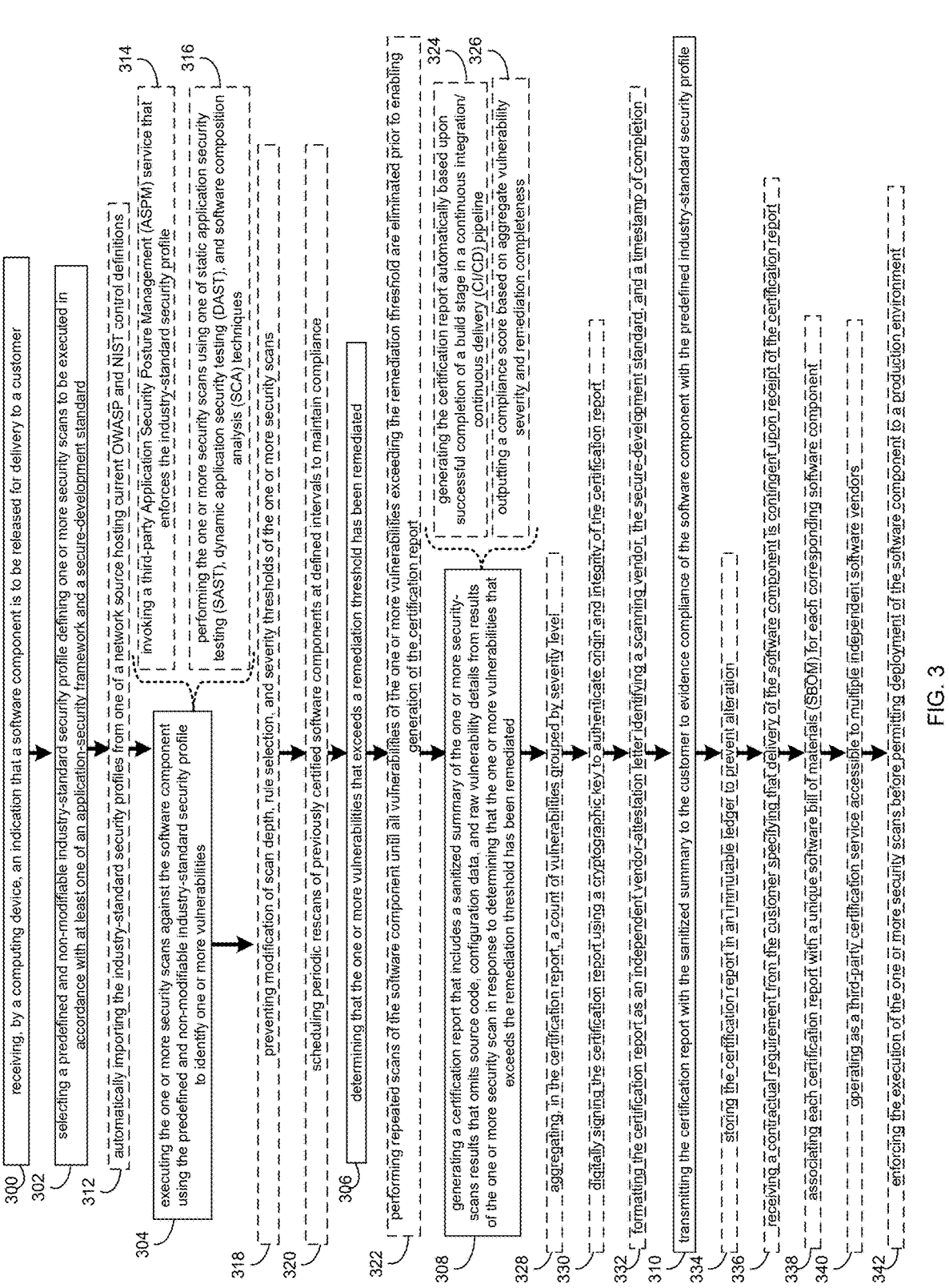

FIG. 3

300 receiving, by a computing device, an indication that a software component is to be released for delivery to a customer 302 selecting a predefined and non-modifiable industry-standard security profile defining one or more security scans to be executed in accordance with at least one of an application-security framework and a secure-development standard 312 automatically importing the industry-standard security profiles from one of a network source hosting current OWASP and NIST control definitions 314 invoking a third-party Application Security Posture Management (ASPM) service that enforces the industry-standard security profile 316 performing the one or more security scans using one of static application security testing (SAST), dynamic application security testing (DAST), and software composition analysis (SCA) techniques 304 executing the one or more security scans against the software component using the predefined and non-modifiable industry-standard security profile to identify one or more vulnerabilities 318 preventing modification of scan depth, rule selection, and severity thresholds of the one or more security scans 320 scheduling periodic rescans of previously certified software components at defined intervals to maintain compliance 306 determining that the one or more vulnerabilities that exceeds a remediation threshold has been remediated 322 performing repeated scans of the software component until all vulnerabilities of the one or more vulnerabilities exceeding the remediation threshold are eliminated prior to enabling generation of the certification report 324 generating the certification report automatically based upon successful completion of a build stage in a continuous integration/ continuous delivery (CI/CD) pipeline 326 outputting a compliance score based on aggregate vulnerability severity and remediation completeness 308 generating a certification report that includes a sanitized summary of the one or more security-scans results that omits source code, configuration data, and raw vulnerability details from results of the one or more security scan in response to determining that the one or more vulnerabilities that exceeds the remediation threshold has been remediated 328 aggregating, in the certification report, a count of vulnerabilities grouped by severity level 330 digitally signing the certification report using a cryptographic key to authenticate origin and integrity of the certification report 332 formatting the certification report as an independent vendor-attestation letter identifying a scanning vendor, the secure-development standard, and a timestamp of completion 310 transmitting the certification report with the sanitized summary to the customer to evidence compliance of the software component with the predefined industry-standard security profile 334 storing the certification report in an immutable ledger to prevent alteration 336 receiving a contractual requirement from the customer specifying that delivery of the software component is contingent upon receipt of the certification report 338 associating each certification report with a unique software bill of materials (SBOM) for each corresponding software component 340 operating as a third-party certification service accessible to multiple independent software vendors 342 enforcing the execution of the one or more security scans before permitting deployment of the software component to a production environment Requirements Per your responses, your project/application/service requires:

- Automated Compliance Testing and Governance

- Network Security Control Plane

- Privilege Usage Management (PAM, UMS)

- Identity Lifecycle Management

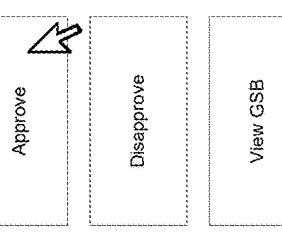

Automated Compliance Testing and Governance:

This includes Cloud Workload Protection Platform (CWPP) scanning and automated remediation, Cloud Access Security Broker (CASB) functionality, posture assessment, vulnerability & patch management, as well as VMDP compliance validation.

Network Security Control Plane:

Layer 3–7 Inspection, encryption interception, network Intrusion Prevention System (IPS) / Intrusion Detection System (IDS), logging/data collection by use case, Virtual Private Network (VPN) termination, port/protocol/ service/IP filtering Firewall (typically stateful), and Distributed Denial of Service (DDoS). Does not include Data Loss Prevention (DLP) and anti-malware as these are part of other core capabilities.

Privilege Usage Management (PAM, UMS):

Includes both Privilege Account Management (PAM) and Privileged Usage Gateway (PUG).

Identity Lifecycle Management:

The process to create, manage, remove, and govern identities for access to business tools and information.

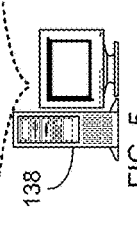

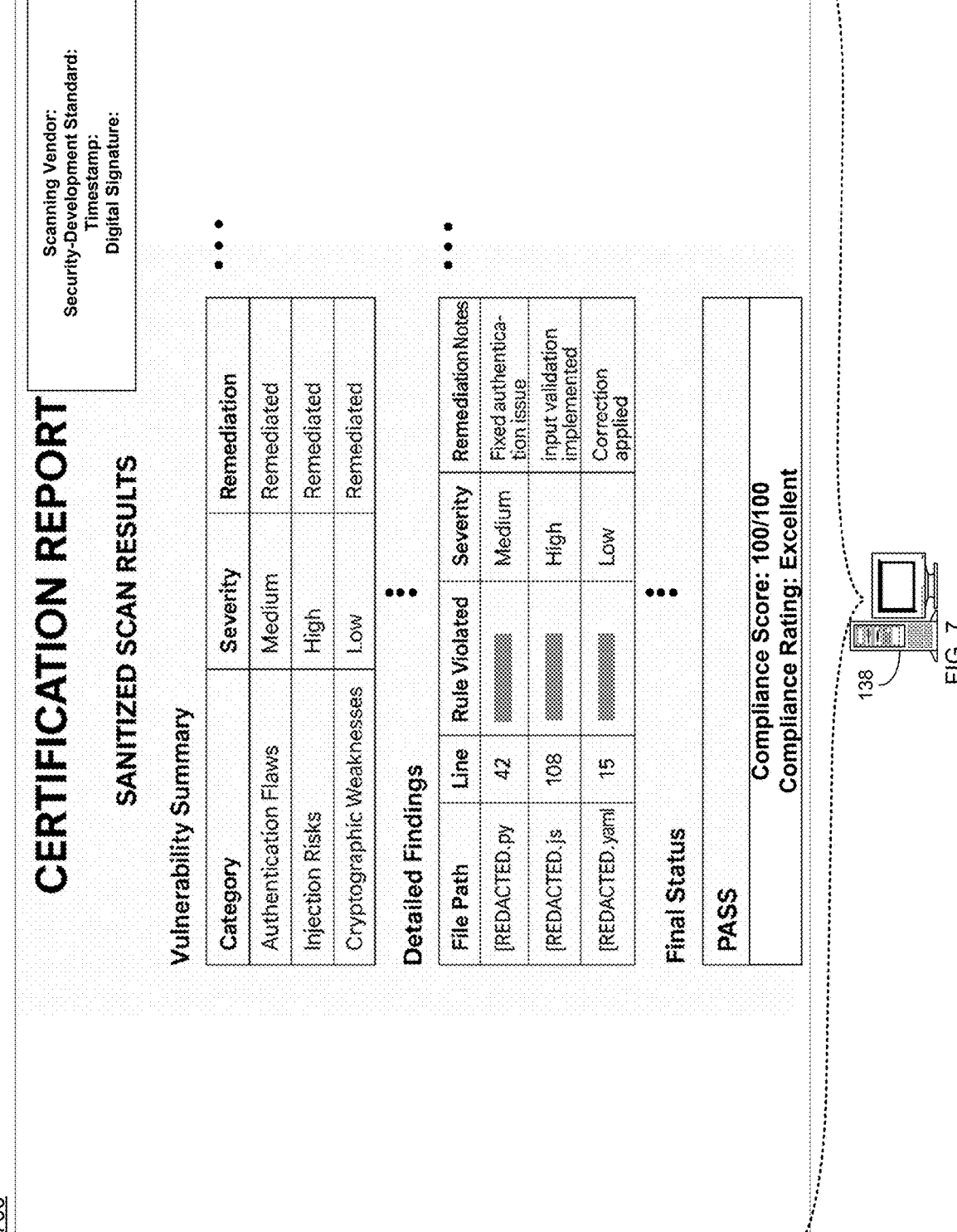

700

CERTIFICATION REPORT

Scanning Vendor:
Security-Development Standard:
Timestamp:
Digital Signature:

SANITIZED SCAN RESULTS

Vulnerability Summary

| Category | Severity | Remediation |
|---|---|---|
| Authentication Flaws | Medium | Remediated |
| Injection Risks | High | Remediated |
| Cryptographic Weaknesses | Low | Remediated |

• • •

Detailed Findings

| File Path | Line | Rule Violated | Severity | Remediation Notes |
|---|---|---|---|---|
| [REDACTED].py | 42 | | Medium | Fixed authentication issue |
| [REDACTED].js | 108 | | High | input validation implemented |
| [REDACTED].yaml | 15 | | Low | Correction applied |

• • •

Final Status

PASS

Compliance Score: 100/100
Compliance Rating: Excellent

SYSTEMS AND METHODS FOR A SANITIZED CODE SCANNING REPORT

TECHNICAL FIELD

The present disclosure relates generally to application security and software assurance, and more particularly to systems and methods for verifying and certifying the security posture of third-party software applications using standardized, automated scans integrated within a continuous integration and continuous delivery (CI/CD) environment, enabling independent, repeatable certification of code security without requiring disclosure of proprietary or sensitive vulnerability data.

BACKGROUND

Organizations increasingly rely on software developed by third-party vendors, open-source communities, and contracted developers. While such external code accelerates development, it also introduces significant security risks that are difficult to assess and manage. In particular, when an organization receives software from a vendor, the organization has little visibility into whether the vendor's development practices comply with recognized security frameworks such as OWASP, NIST Secure Software Development Framework (SSDF), or other "secure by design" standards.

SUMMARY

In one example implementation, a computer-implemented method, performed by one or more computing devices, may include but is not limited to receiving, by a computing device, an indication that a software component is to be released for delivery to a customer. A predefined and non-modifiable industry-standard security profile may be selected defining one or more security scans to be executed in accordance with at least one of an application-security framework and a secure-development standard. The one or more security scans may be executed against the software component using the predefined and non-modifiable industry-standard security profile to identify one or more vulnerabilities. It may be determined that the one or more vulnerabilities that exceeds a remediation threshold has been remediated. A certification report may be generated that includes a sanitized summary of the one or more security-scans results that omits source code, configuration data, and raw vulnerability details from results of the one or more security scan in response to determining that the one or more vulnerabilities that exceeds the remediation threshold has been remediated. The certification report with the sanitized summary may be transmitted to the customer to evidence compliance of the software component with the predefined industry-standard security profile.

One or more of the following example features may be included. The predefined industry-standard security profile may be based on at least one of Open Web Application Security Project (OWASP) framework and National Institute of Standards and Technology (NIST) Secure Software Development Framework (SSDF). A count of vulnerabilities grouped by severity level may be aggregated in the certification report. The certification report may be digitally signed using a cryptographic key to authenticate origin and integrity of the certification report. Executing the one or more security scans may comprise invoking a third-party Application Security Posture Management (ASPM) service that enforces the industry-standard security profile. Modification of scan depth, rule selection, and severity thresholds of the one or more security scans may be prevented. Repeated scans of the software component may be performed until all vulnerabilities of the one or more vulnerabilities exceeding the remediation threshold are eliminated prior to enabling generation of the certification report. The certification report may be formatted as an independent vendor-attestation letter identifying a scanning vendor, the secure-development standard, and a timestamp of completion. The certification report may be stored in an immutable ledger to prevent alteration. Generating the certification report may include generating the certification report automatically based upon successful completion of a build stage in a continuous integration/continuous delivery (CI/CD) pipeline. A contractual requirement may be received from the customer specifying that delivery of the software component is contingent upon receipt of the certification report. Executing the one or more security scans may include performing the one or more security scans using one of static application security testing (SAST), dynamic application security testing (DAST), and software composition analysis (SCA) techniques. Each certification report may be associated with a unique software bill of materials (SBOM) for each corresponding software component. Periodic rescans of previously certified software components may be scheduled at defined intervals to maintain compliance. The system may operate as a third-party certification service accessible to multiple independent software vendors. The industry-standard security profiles may be automatically imported from one of a network source hosting current OWASP and NIST control definitions. Generating the certification report may include outputting a compliance score based on aggregate vulnerability severity and remediation completeness. The execution of the one or more security scans may be enforced before permitting deployment of the software component to a production environment.

In another example implementation, a computing system may include one or more processors and one or more memories configured to perform operations that may include but are not limited to receiving, by a computing device, an indication that a software component is to be released for delivery to a customer. A predefined and non-modifiable industry-standard security profile may be selected defining one or more security scans to be executed in accordance with at least one of an application-security framework and a secure-development standard. The one or more security scans may be executed against the software component using the predefined and non-modifiable industry-standard security profile to identify one or more vulnerabilities. It may be determined that the one or more vulnerabilities that exceeds a remediation threshold has been remediated. A certification report may be generated that includes a sanitized summary of the one or more security-scans results that omits source code, configuration data, and raw vulnerability details from results of the one or more security scan in response to determining that the one or more vulnerabilities that exceeds the remediation threshold has been remediated. The certification report with the sanitized summary may be transmitted to the customer to evidence compliance of the software component with the predefined industry-standard security profile.

One or more of the following example features may be included. The predefined industry-standard security profile may be based on at least one of Open Web Application Security Project (OWASP) framework and National Institute of Standards and Technology (NIST) Secure Software Development Framework (SSDF). A count of vulnerabilities grouped by severity level may be aggregated in the certification report. The certification report may be digitally signed using a cryptographic key to authenticate origin and integrity of the certification report. Executing the one or more security scans may comprise invoking a third-party Application Security Posture Management (ASPM) service that enforces the industry-standard security profile. Modification of scan depth, rule selection, and severity thresholds of the one or more security scans may be prevented. Repeated scans of the software component may be performed until all vulnerabilities of the one or more vulnerabilities exceeding the remediation threshold are eliminated prior to enabling generation of the certification report. The certification report may be formatted as an independent vendor-attestation letter identifying a scanning vendor, the secure-development standard, and a timestamp of completion. The certification report may be stored in an immutable ledger to prevent alteration. Generating the certification report may include generating the certification report automatically based upon successful completion of a build stage in a continuous integration/continuous delivery (CI/CD) pipeline. A contractual requirement may be received from the customer specifying that delivery of the software component is contingent upon receipt of the certification report. Executing the one or more security scans may include performing the one or more security scans using one of static application security testing (SAST), dynamic application security testing (DAST), and software composition analysis (SCA) techniques. Each certification report may be associated with a unique software bill of materials (SBOM) for each corresponding software component. Periodic rescans of previously certified software components may be scheduled at defined intervals to maintain compliance. The system may operate as a third-party certification service accessible to multiple independent software vendors. The industry-standard security profiles may be automatically imported from one of a network source hosting current OWASP and NIST control definitions. Generating the certification report may include outputting a compliance score based on aggregate vulnerability severity and remediation completeness. The execution of the one or more security scans may be enforced before permitting deployment of the software component to a production environment.

In another example implementation, a computer program product may reside on a computer readable storage medium having a plurality of instructions stored thereon which, when executed across one or more processors, may cause at least a portion of the one or more processors to perform operations that may include but are not limited to receiving, by a computing device, an indication that a software component is to be released for delivery to a customer. A predefined and non-modifiable industry-standard security profile may be selected defining one or more security scans to be executed in accordance with at least one of an application-security framework and a secure-development standard. The one or more security scans may be executed against the software component using the predefined and non-modifiable industry-standard security profile to identify one or more vulnerabilities. It may be determined that the one or more vulnerabilities that exceeds a remediation threshold has been remediated. A certification report may be generated that includes a sanitized summary of the one or more security-scans results that omits source code, configuration data, and raw vulnerability details from results of the one or more security scan in response to determining that the one or more vulnerabilities that exceeds the remediation threshold has been remediated. The certification report with the sanitized summary may be transmitted to the customer to evidence compliance of the software component with the predefined industry-standard security profile.

One or more of the following example features may be included. The predefined industry-standard security profile may be based on at least one of Open Web Application Security Project (OWASP) framework and National Institute of Standards and Technology (NIST) Secure Software Development Framework (SSDF). A count of vulnerabilities grouped by severity level may be aggregated in the certification report. The certification report may be digitally signed using a cryptographic key to authenticate origin and integrity of the certification report. Executing the one or more security scans may comprise invoking a third-party Application Security Posture Management (ASPM) service that enforces the industry-standard security profile. Modification of scan depth, rule selection, and severity thresholds of the one or more security scans may be prevented. Repeated scans of the software component may be performed until all vulnerabilities of the one or more vulnerabilities exceeding the remediation threshold are eliminated prior to enabling generation of the certification report. The certification report may be formatted as an independent vendor-attestation letter identifying a scanning vendor, the secure-development standard, and a timestamp of completion. The certification report may be stored in an immutable ledger to prevent alteration. Generating the certification report may include generating the certification report automatically based upon successful completion of a build stage in a continuous integration/continuous delivery (CI/CD) pipeline. A contractual requirement may be received from the customer specifying that delivery of the software component is contingent upon receipt of the certification report. Executing the one or more security scans may include performing the one or more security scans using one of static application security testing (SAST), dynamic application security testing (DAST), and software composition analysis (SCA) techniques. Each certification report may be associated with a unique software bill of materials (SBOM) for each corresponding software component. Periodic rescans of previously certified software components may be scheduled at defined intervals to maintain compliance. The system may operate as a third-party certification service accessible to multiple independent software vendors. The industry-standard security profiles may be automatically imported from one of a network source hosting current OWASP and NIST control definitions. Generating the certification report may include outputting a compliance score based on aggregate vulnerability severity and remediation completeness. The execution of the one or more security scans may be enforced before permitting deployment of the software component to a production environment.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DRAWINGS

FIG. 1 is an example diagrammatic view of a security process coupled to an example distributed computing network according to one or more example implementations of the disclosure;

5

FIG. 3 is an example flowchart of a security process according to one or more example implementations of the disclosure;

FIG. 5 is an example diagrammatic view of a screen image displayed by a security process according to one or more example implementations of the disclosure;

FIG. 7 is an example diagrammatic view of a screen image displayed by a security process according to one or more example implementations of the disclosure.

Like reference symbols in the various drawings indicate like elements.

DESCRIPTION

System Overview

Figure 1:
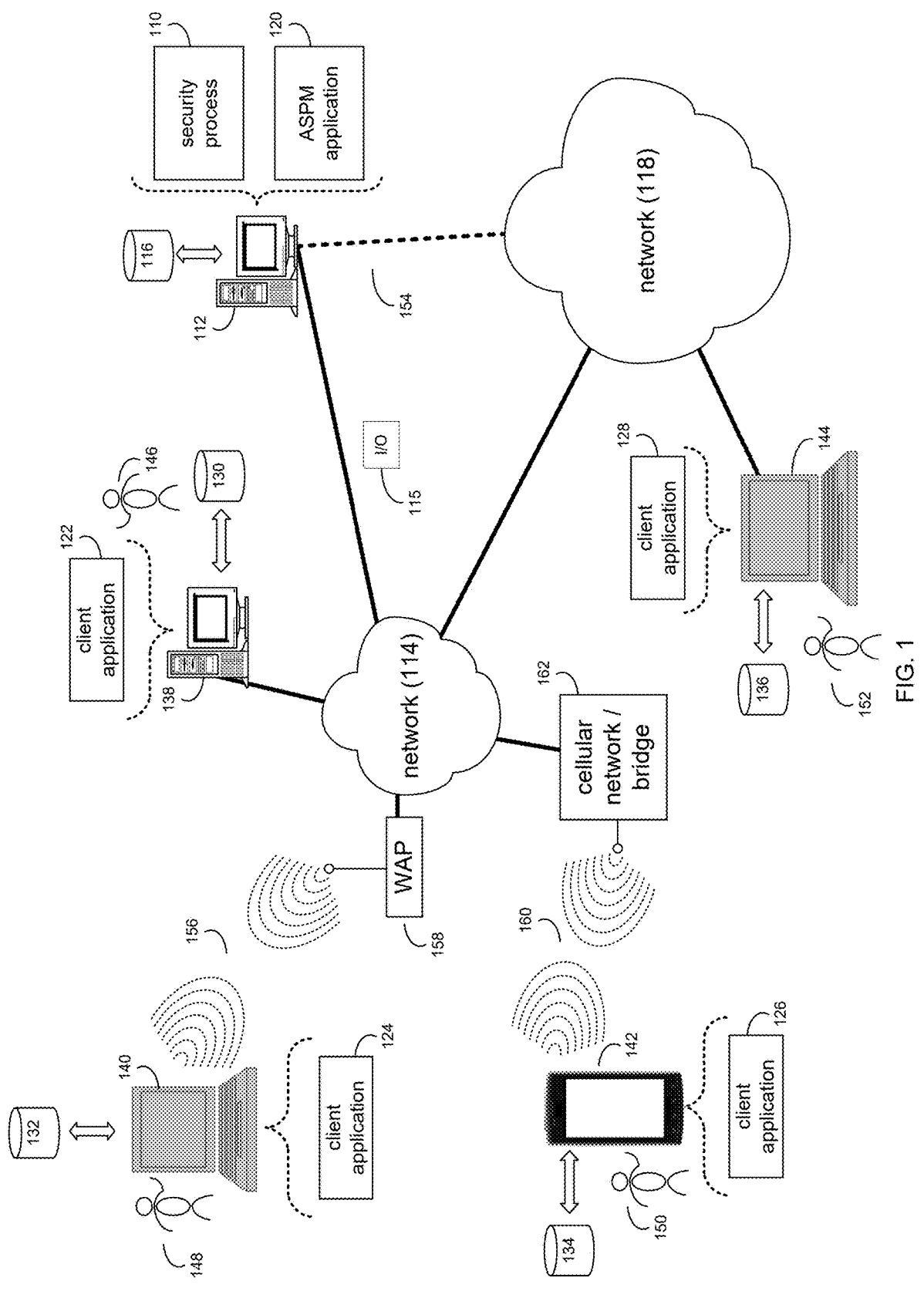

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

Software may include artificial intelligence (AI) systems, which may include machine learning or other computational intelligence. For example, AI may include one or more models used for one or more problem domains. When presented with many data features, identification of a subset of features that are relevant to a problem domain may improve prediction accuracy, reduce storage space, and increase processing speed. This identification may be referred to as feature engineering. Feature engineering may be performed by users or may only be guided by users. In various implementations, a machine learning system may computationally identify relevant features, such as by performing singular value decomposition on the contributions of different features to outputs.

In some implementations, the various computing devices may include, integrate with, link to, exchange data with, be governed by, take inputs from, and/or provide outputs to one or more AI systems, which may include models, rule-based systems, expert systems, neural networks, deep learning systems, supervised learning systems, robotic process automation systems, natural language processing systems, intelligent agent systems, self-optimizing and self-organizing systems, and others. Except where context specifically indicates otherwise, references to AI, or to one or more examples of AI, should be understood to encompass one or more of these various alternative methods and systems; for example, without limitation, an AI system described for enabling any of a wide variety of functions, capabilities and solutions described herein (such as optimization, autonomous operation, prediction, control, orchestration, or the like) should be understood to be capable of implementation by operation on a model or rule set; by training on a training data set of human tag, labels, or the like; by training on a training data set of human interactions (e.g., human interactions with software interfaces or hardware systems); by training on a training data set of outcomes; by training on an AI-generated training data set (e.g., where a full training data set is generated by AI from a seed training data set); by supervised learning; by semi-supervised learning; by deep learning; or the like. For any given function or capability that is described herein, neural networks of various types may be used, including any of the types described herein, and in embodiments a hybrid set of neural networks may be selected such that within the set a neural network type that is more favorable for performing each element of a multi-function or multi-capability system or method is implemented. As one example among many, a deep learning, or black box, system may use a gated recurrent neural network for a function like language translation for an intelligent agent, where the underlying mechanisms of AI operation need not be understood as long as outcomes are favorably perceived by users, while a more transparent model or system and a simpler neural network may be used for a system for automated governance, where a greater understanding of how inputs are translated to outputs may be needed to comply with regulations or policies.

Examples of the models (e.g., AI-based models) include recurrent neural networks (RNNs) such as long short-term memory (LSTM), deep learning models such as transformers, decision trees, support-vector machines, genetic algorithms, Bayesian networks, and regression analysis. Examples of systems based on a transformer model include bidirectional encoder representations from transformers (BERT) and generative pre-trained transformers (GPT). Training a machine-learning model (or other type of AI-based learning models) may include supervised learning (for example, based on labelled input data), unsupervised learning, and reinforcement learning. In various embodiments, a machine-learning model may be pre-trained by their operator or by a third party. Problem domains include nearly any situation where structured data can be collected, and includes natural language processing (NLP), including natural language understanding (NLU), computer vision (CV), classification, image recognition, etc. Some or all of the software may run in a virtual environment rather than directly on hardware. The virtual environment may include a hypervisor, emulator, sandbox, container engine, etc. The software may be built as a virtual machine, a container, etc. Virtualized resources may be controlled using, for example, a DOCKER container platform, a pivotal cloud foundry (PCF) platform, etc. Some or all of the software may be logically partitioned into microservices. Each microservice offers a reduced subset of functionality. In various embodiments, each microservice may be scaled independently depending on load, either by devoting more resources to the microservice or by instantiating more instances of the microservice. In various embodiments, functionality offered by one or more microservices may be combined with each other and/or with other software not adhering to a microservices model.

In some implementations, as noted above, AI-based learning models may include at least one of a transformer model, a convolutional neural network, a deep learning model trained on a set of outcomes of the value chain network entity, a supervised model, a semi-supervised model, an unsupervised model, or a reinforcement model, and the training data set for the AI-based learning models may include one or a set of objects or events that are labeled to classify the set of objects or events according to a classification taxonomy. Other examples of AI-based learning models (e.g., machine learning models) may include neural networks in general (e.g., deep neural networks, convolution neural networks, and many others), regression-based models, decision trees, hidden forests, Hidden Markov models, Bayesian models, and the like. In some implementations, the present disclosure may include combinations where an expert system uses one neural network for classifying an item and a different (or the same) neural network for predicting a state of the item.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium or storage device may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, solid state drives (SSDs), a digital versatile disk (DVD), a Blu-ray disc, and an Ultra HD Blu-ray disc, a static random access memory (SRAM), dynamic RAM (DRAM), synchronous DRAM (SDRAM), synchronous graphics RAM (SGRAM), and video RAM (VRAM), analog magnetic tape, digital magnetic tape, rotating hard disk drive (HDDs), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

Examples of storage implemented by the storage hardware include a distributed ledger, such as a permissioned or permissionless blockchain. Entities recording transactions, such as in a blockchain, may reach consensus using an algorithm such as proof-of-stake, proof-of-work, and proof-of-storage. Elements of the present disclosure may be represented by or encoded as non-fungible tokens (NFTs). Ownership rights related to the non-fungible tokens may be recorded in or referenced by a distributed ledger. Transactions initiated by or relevant to the present disclosure may use one or both of fiat currency and cryptocurrencies, examples of which include bitcoin and ether.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, state information that personalizes electronic circuitry and/or other structural components that are native to hardware (e.g., host processor, central processing unit/CPU, microcontroller, etc.) or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a network, such as a cellular network, local area network (LAN), a wide area network (WAN), a body area network BAN), a personal area network (PAN), a metropolitan area network (MAN), etc., or the connection may be made to an external computer (for example, through the internet using an Internet Service Provider). The networks may include one or more of point-to-point and mesh technologies. Data transmitted or received by the networking components may traverse the same or different networks. Networks may be connected to each other over a WAN or point-to-point leased lines using technologies such as Multiprotocol Label Switching (MPLS) and virtual private networks (VPNs), etc. In some implementations, electronic circuitry including, for example, programmable logic circuitry, an application specific integrated circuit (ASIC), gate arrays such as field-programmable gate arrays (FPGAs) or other hardware accelerators, micro-controller units (MCUs), or programmable logic arrays (PLAs), integrated circuits (ICs), digital circuit elements, analog circuit elements, combinational logic circuits, digital signal processors (DSPs), complex programmable logic devices (CPLDs), memory chips, network chips, systems on chip (SoCs), SSD/NAND controller ASICs, and the like, etc. may execute the computer readable program instructions/code by utilizing state information of the computer readable program instructions to personalize the electronic circuitry, in order to perform aspects of the present disclosure. Configurable or fixed-functionality logic may be implemented with complementary metal oxide semiconductor (CMOS) logic circuits, transistor-transistor logic (TTL) logic circuits, or other circuits. Multiple components of the hardware may be integrated, such as on a single die, in a single package, or on a single printed circuit board or logic board. For example, multiple components of the hardware may be implemented as a system-on-chip. A component, or a set of integrated components, may be referred to as a chip, chipset, chiplet, or chip stack. Examples of a system-on-chip include a radio frequency (RF) system-on-chip, an AI system-on-chip, a video processing system-on-chip, an organ-on-chip, a quantum algorithm system-on-chip, etc.

Examples of processing hardware may include, e.g., a central processing unit (CPU), a graphics processing unit (GPU), an accelerator (e.g., an AI accelerator), an approximate computing processor, a quantum computing processor, a parallel computing processor, a neural network processor, a signal processor, a digital processor, an analog processor, a data processor, an embedded processor, a microprocessor, and a co-processor. The co-processor may provide additional processing functions and/or optimizations, such as for speed or power consumption. Examples of a co-processor include a math co-processor, a graphics co-processor, a communication co-processor, a video co-processor, and an AI co-processor.

In some implementations, the AI accelerator may include suitable logic, circuitry, and/or interfaces to accelerate artificial intelligence applications, such as, e.g., artificial neural networks, machine vision and machine learning applications, including through parallel processing techniques. In one or more examples, the AI accelerator may include hardware logic or devices such as, e.g., a GPU or an FPGA. The AI accelerator may be used with any of the devices, components, features or methods described herein.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved. In addition, in some of the drawings, signal conductor lines may be represented with lines. Some may be different, to indicate more constituent signal paths, have a number label, to indicate a number of constituent signal paths, and/or have arrows at one or more ends, to indicate primary information flow direction(s). This, however, should not be construed in a limiting manner. Rather, such added detail may be used in connection with one or more implementations to facilitate ease of understanding. Any represented lines, whether or not having additional information, may actually comprise one or more signals/information that may travel in multiple directions and may be implemented with any suitable type of signal scheme, e.g., digital or analog lines implemented with differential pairs, optical fiber lines, and/or single-ended lines, etc.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown security process 110 that may reside on and may be executed by a computer (e.g., computer 112), which may be connected to a network (e.g., network 114) (e.g., the internet or a local area network). Examples of computer 112 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer (s), or a computing cloud(s). A SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 112 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a security process, such as security process 110 of FIG. 1, may receive, by a computing device, an indication that a software component is to be released for delivery to a customer. A predefined and non-modifiable industry-standard security profile may be selected defining one or more security scans to be executed in accordance with at least one of an application-security framework and a secure-development standard. The one or more security scans may be executed against the software component using the predefined and non-modifiable industry-standard security profile to identify one or more vulnerabilities. It may be determined that the one or more vulnerabilities that exceeds a remediation threshold has been remediated. A certification report may be generated that includes a sanitized summary of the one or more security-scans results that omits source code, configuration data, and raw vulnerability details from results of the one or more security scan in response to determining that the one or more vulnerabilities that exceeds the remediation threshold has been remediated. The certification report with the sanitized summary may be transmitted to the customer to evidence compliance of the software component with the predefined industry-standard security profile.

In some implementations, the instruction sets and subroutines of security process 110, which may be stored on storage device, such as storage device 116, coupled to computer 112, may be executed by one or more processors and one or more memory architectures included within computer 112. In some implementations, storage device 116 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 116 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 114 may be connected to one or more secondary networks (e.g., network 118), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 112 may include a data store, such as a database (e.g., relational database, object-oriented database, triplestore database, etc.), a data store, a data lake, a column store, and/or a data warehouse, and may be located within any suitable memory location, such as storage device 116 coupled to computer 112. In some implementations, data, metadata, information, etc. described throughout the present disclosure may be stored in the data store. In some implementations, computer 112 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, security process 110 may be a component of the data store, a standalone application that interfaces with the above noted data store and/or an applet/application that is accessed via client applications 122, 124, 126, 128. In some implementations, the above noted data store may be, in whole or in part, distributed in a cloud computing topology. In this way, computer 112 and storage device 116 may refer to multiple devices, which may also be distributed throughout the network.

In some implementations, computer 112 may execute an application security posture management (ASPM) process (e.g., ASPM application 120), examples of which may include, but are not limited to, a code scanning application configured to identify vulnerabilities in source code; a secure build orchestration application integrated with a continuous integration/continuous delivery (CI/CD) pipeline to enforce execution of security scans; a policy management application configured to import and apply predefined industry-standard security frameworks (e.g., OWASP, NIST SSDF, or other secure-by-design standards); a remediation tracking application configured to verify correction of vulnerabilities meeting or exceeding a defined severity threshold; a certification report generation application configured to produce sanitized compliance summaries without exposing sensitive vulnerability details; a digital attestation application configured to sign or timestamp certification reports for authenticity verification; a vendor compliance management application configured to associate certification reports with corresponding software builds or software bills of materials (SBOMs); or another application that enables enforcement, verification, and standardized certification of software security posture for vendor-supplied applications. In operation, the above applications may interoperate to enforce and evidence secure software development practices within a vendor environment. For example, the code scanning application may automatically initiate one or more static or dynamic analysis scans on a software build as part of a CI/CD pipeline execution. The policy management application may retrieve a predefined and non-modifiable security profile corresponding to an accepted industry framework (e.g., OWASP or NIST SSDF) and apply the profile to define the scope, depth, and severity thresholds of each scan. The secure build orchestration application may ensure that code promotion or deployment cannot proceed until all vulnerabilities meeting or exceeding the defined severity threshold have been remediated. Upon determining compliance, the certification report generation application may compile scan outcomes into a sanitized certification report that summarizes aggregate vulnerability counts and associated severity levels without revealing proprietary code or detailed exploit data. The digital attestation application may cryptographically sign or timestamp the certification report to ensure its authenticity and traceability. The vendor compliance management application may then associate the generated certification report with the corresponding software build or SBOM and transmit the report to a requesting customer or compliance repository as evidence that the vendor's application has satisfied standardized application security requirements.

In some implementations, security process 110 and/or ASPM application 120 may be accessed via one or more of client applications 122, 124, 126, 128. In some implementations, security process 110 may be a standalone application, or may be an applet/application/script/extension that may interact with and/or be executed within ASPM application 120, a component of ASPM application 120, and/or one or more of client applications 122, 124, 126, 128. In some implementations, ASPM application 120 may be a standalone application, or may be an applet/application/script/extension that may interact with and/or be executed within security process 110, a component of security process 110, and/or one or more of client applications 122, 124, 126, 128. In some implementations, one or more of client applications 122, 124, 126, 128 may be a standalone application, or may be an applet/application/script/extension that may interact with and/or be executed within and/or be a component of security process 110 and/or ASPM application 120. Examples of client applications 122, 124, 126, 128 may include, but are not limited to, e.g., a code scanning application configured to identify vulnerabilities in source code; a secure build orchestration application integrated with a continuous integration/continuous delivery (CI/CD) pipeline to enforce execution of security scans; a policy management application configured to import and apply predefined industry-standard security frameworks (e.g., OWASP, NIST SSDF, or other secure-by-design standards); a remediation tracking application configured to verify correction of vulnerabilities meeting or exceeding a defined severity threshold; a certification report generation application configured to produce sanitized compliance summaries without exposing sensitive vulnerability details; a digital attestation application configured to sign or timestamp certification reports for authenticity verification; a vendor compliance management application configured to associate certification reports with corresponding software builds or software bills of materials (SBOMs); or another application that enables enforcement, verification, and standardized certification of software security posture for vendor-supplied applications, a chatbot application, a virtual assistant application, a standard and/or mobile web browser, an email application (e.g., an email client application), a textual and/or a graphical user interface, a customized web browser, a plugin, an Application Programming Interface (API), or a custom application. The instruction sets and subroutines of client applications 122, 124, 126, 128, which may be stored on storage devices 130, 132, 134, 136, may be executed by one or more processors and one or more memory architectures incorporated into client electronic devices 138, 140, 142, 144.

In some implementations, one or more of storage devices 130, 132, 134, 136, may include but are not limited to: hard disk drives; flash drives, tape drives; optical drives; RAID arrays; random access memories (RAM); and read-only memories (ROM). Examples of client electronic devices 138, 140, 142, 144 (and/or computer 112) may include, but are not limited to, a personal computer (e.g., client electronic device 138), a laptop computer (e.g., client electronic device 140), a smart/data-enabled, cellular phone (e.g., client electronic device 142), a notebook computer (e.g., client electronic device 144), a tablet, a server, a television, a smart television, a smart speaker, an Internet of Things (IoT) device, a media (e.g., audio/video, photo, etc.) capturing and/or output device, an audio input and/or recording device (e.g., a handheld microphone, a lapel microphone, an embedded microphone/speaker (such as those embedded within eyeglasses, smart phones, tablet computers, smart televisions, smart speakers, watches, etc.), an infotainment device (e.g., such as those found in vehicles combining information and/or entertainment with optional screens and/or audio for such things as navigation, multimedia, connectivity, voice control, smartphone integration, touchscreen interface, internet and apps, rear-seat entertainment, etc.), a dedicated network device, and combinations thereof. Client electronic devices 138, 140, 142, 144 may each execute an operating system, examples of which may include but are not limited to, Android™, Apple® iOS®, Mac® OS X®;

Red Hat® Linux®, Windows® Mobile, Chrome OS, Blackberry OS, Fire OS, or a custom operating system.

In some implementations, one or more of client applications 122, 124, 126, 128 may be configured to effectuate some or all of the functionality of security process 110 (and vice versa). Accordingly, in some implementations, security process 110 may be a purely server-side application, a purely client-side application, or a hybrid server-side/client-side application that is cooperatively executed by one or more of client applications 122, 124, 126, 128 and/or security process 110.

In some implementations, one or more of client applications 122, 124, 126, 128 may be configured to effectuate some or all of the functionality of ASPM application 120 (and vice versa). Accordingly, in some implementations, ASPM application 120 may be a purely server-side application, a purely client-side application, or a hybrid server-side/client-side application that is cooperatively executed by one or more of client applications 122, 124, 126, 128 and/or ASPM application 120. As one or more of client applications 122, 124, 126, 128, security process 110, and ASPM application 120, taken singly or in any combination, may effectuate some or all of the same functionality, any description of effectuating such functionality via one or more of client applications 122, 124, 126, 128, security process 110, ASPM application 120, or combination thereof, and any described interaction(s) between one or more of client applications 122, 124, 126, 128, security process 110, ASPM application 120, or combination thereof to effectuate such functionality, should be taken as an example only and not to limit the scope of the disclosure.

In some implementations, one or more of users 146, 148, 150, 152 may access computer 112 and security process 110 (e.g., using one or more of client electronic devices 138, 140, 142, 144) directly through network 114 or through network 118. Further, computer 112 may be connected to network 114 through network 118, as illustrated with phantom link line 154. Security process 110 may include one or more user interfaces, such as browsers and textual or graphical user interfaces, through which users 146, 148, 150, 152 may access security process 110.

In some implementations, the various client electronic devices may be directly or indirectly coupled to network 114 (or network 118). For example, client electronic device 138 is shown directly coupled to network 114 via a hardwired network connection. Further, client electronic device 144 is shown directly coupled to network 118 via a hardwired network connection. Client electronic device 140 is shown wirelessly coupled to network 114 via wireless communication channel 156 established between client electronic device 140 and wireless access point (i.e., WAP 158), which is shown directly coupled to network 114. WAP 158 may be, for example, an IEEE 802.11a, 802.11b, 802.11 g, 802.11n, 802.11ac, Wi-Fi®, RFID, and/or Bluetooth™ (including Bluetooth™ Low Energy) or any device that is capable of establishing wireless communication channel 156 between client electronic device 140 and WAP 158 (e.g., Zigbee, Z-Wave, etc.). Client electronic device 142 is shown wirelessly coupled to network 114 via wireless communication channel 160 established between client electronic device 142 and cellular network/bridge 162, which is shown by example directly coupled to network 114.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used. In some implementations, computer 112 may be directed or controlled by an operator. Computer 112 may be hosted by one or more of assets owned by the operator, assets leased by the operator, and third-party assets. The assets may be referred to as a private, community, or hybrid cloud computing network or cloud computing environment. For example, computer 112 may be partially or fully hosted by a third-party offering software as a service (Saas), platform as a service (PaaS), and/or infrastructure as a service (IaaS). Computer 112 may be implemented using agile development and operations (DevOps) principles. In some implementations, some or all of computer 112 may be implemented in a multiple-environment architecture. For example, the multiple environments may include one or more production environments, one or more integration environments, one or more development environments, etc.

In some implementations, various I/O requests (e.g., I/O request 115) may be sent from, e.g., client applications 122, 124, 126, 128 to, e.g., computer 112 (and vice versa). Examples of I/O request 115 may include but are not limited to, data write requests (e.g., a request that content be written to computer 112) and data read requests (e.g., a request that content be read from computer 112). Client electronic devices 138, 140, 142, 144 and/or computer 112 may also communicate audibly using an audio codec, which may receive spoken information from a user and convert it to usable digital information. An audio codec may likewise generate audible sound for a user, such as through a speaker, e.g., in a handset of a client electronic device. Such sound may include sound from voice telephone calls, may include recorded sound (e.g., voice messages, music files, etc.) and may also include sound generated by applications operating on the client electronic devices.

Figure 2:
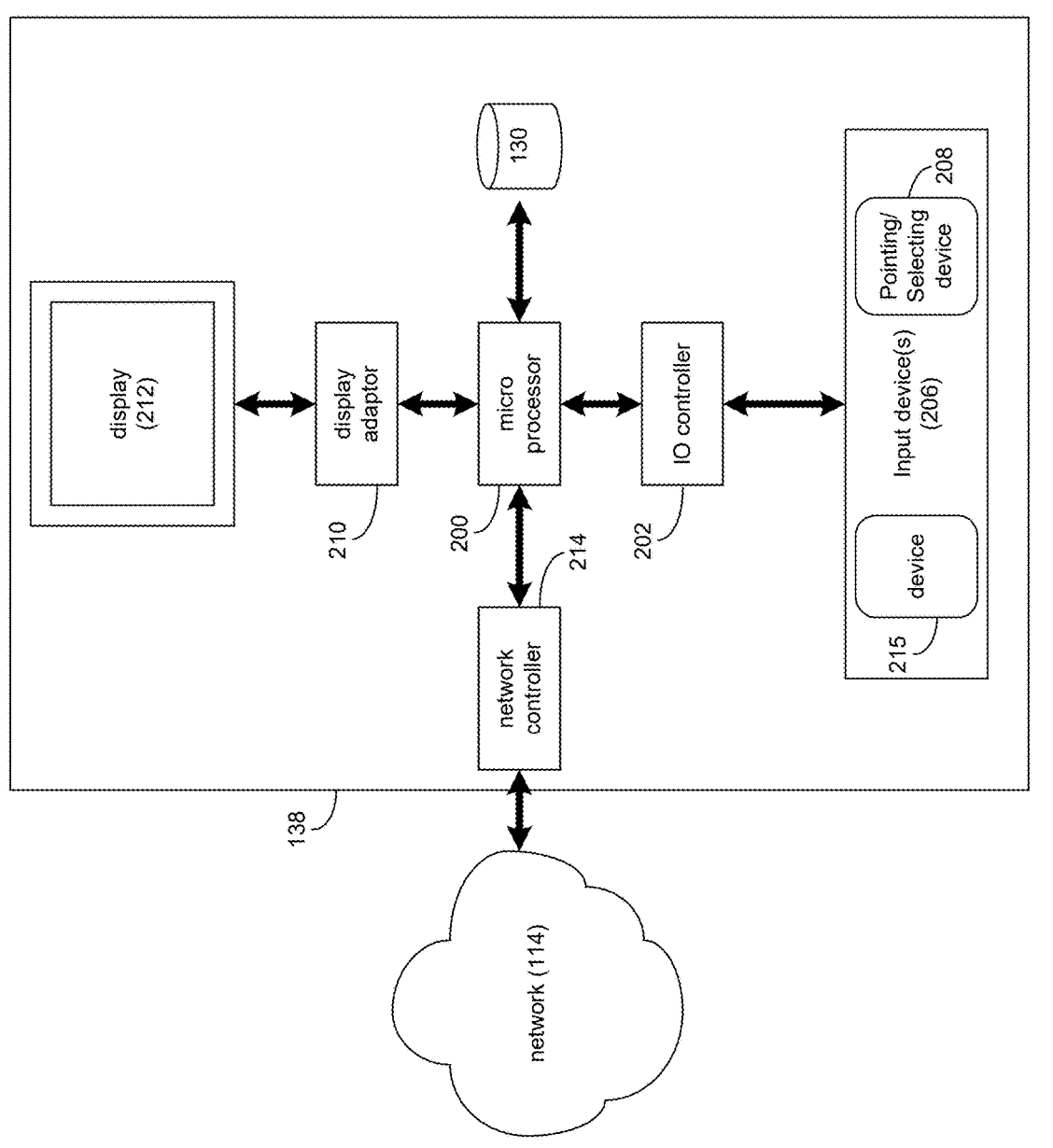
FIG. 2 is an example diagrammatic view of a client electronic device of FIG. 1 according to one or more example implementations of the disclosure.

Referring also to the example implementation of FIG. 2, there is shown a diagrammatic view of client electronic device 138. While client electronic device 138 is shown in this figure, this is for example purposes only and is not intended to be a limitation of this disclosure, as other configurations are possible. Additionally, any computing device capable of executing, in whole or in part, security process 110 may be substituted for client electronic device 138 (in whole or in part) within FIG. 2, examples of which may include but are not limited to computer 112 and/or one or more of client electronic devices 138, 140, 142, 144.

In some implementations, client electronic device 138 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 130). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), scanner, custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214

(e.g., an Ethernet adaptor) may be configured to couple microprocessor 200 to network 114 (e.g., the Internet or a local area network).

The Graphical Security Blueprint:

As discussed above and referring also at least to the example implementations of FIGS. 3-6, in some implementations, security process 110 may receive, via a graphical user interface, user input describing application requirements of an application, and in some implementations, the user input may be collected using a questionnaire-based web form. For instance, security process 110 begins by collecting information from the person requesting a security blueprint. As a non-limiting example, imagine a project team at a bank that needs to launch a new online application. Instead of writing lengthy technical documents, the requester opens a web form 400 like the one shown in FIG. 4. They answer structured questions about who will use the system, what kind of data it will handle, and what level of sensitivity the data has. These answers provide the raw material for the automated process that will later generate a graphical security blueprint (GSB).

In some implementations, the graphical user interface (GUI) may be delivered as a secure web application built on a client-server model. The front end runs in a browser, providing structured form fields such as dropdowns, checkboxes, and text inputs. Each question is linked to a unique identifier so that when the form is submitted, the backend service translates the answers into a structured data object (for example, JSON). This object contains key-value pairs mapping each requirement to a predefined attribute. The interface enforces input validation to reduce errors and ensures data integrity. This provides a repeatable, standardized method for gathering application requirements, minimizing the ambiguity that often arises when requirements are gathered informally.

In some implementations, the GUI is implemented as a desktop application with an offline mode. Here, the questionnaire responses are cached locally in a lightweight database such as SQLite. When network connectivity is available, the responses synchronize with the main server. This variant requires additional logic for conflict resolution in case two offline sessions attempt to update the same application record. The benefit is that it allows users working in restricted or disconnected environments to still prepare the necessary input without relying on constant connectivity.

In some implementations, a conversational interface, such as a chatbot integrated into an enterprise collaboration platform, may be used. Instead of (or in addition to) filling out a traditional form, the user answers a guided sequence of natural-language questions. These answers are parsed through natural language processing (NLP) modules, which map key terms into structured fields similar to those noted above.

Figure 4:
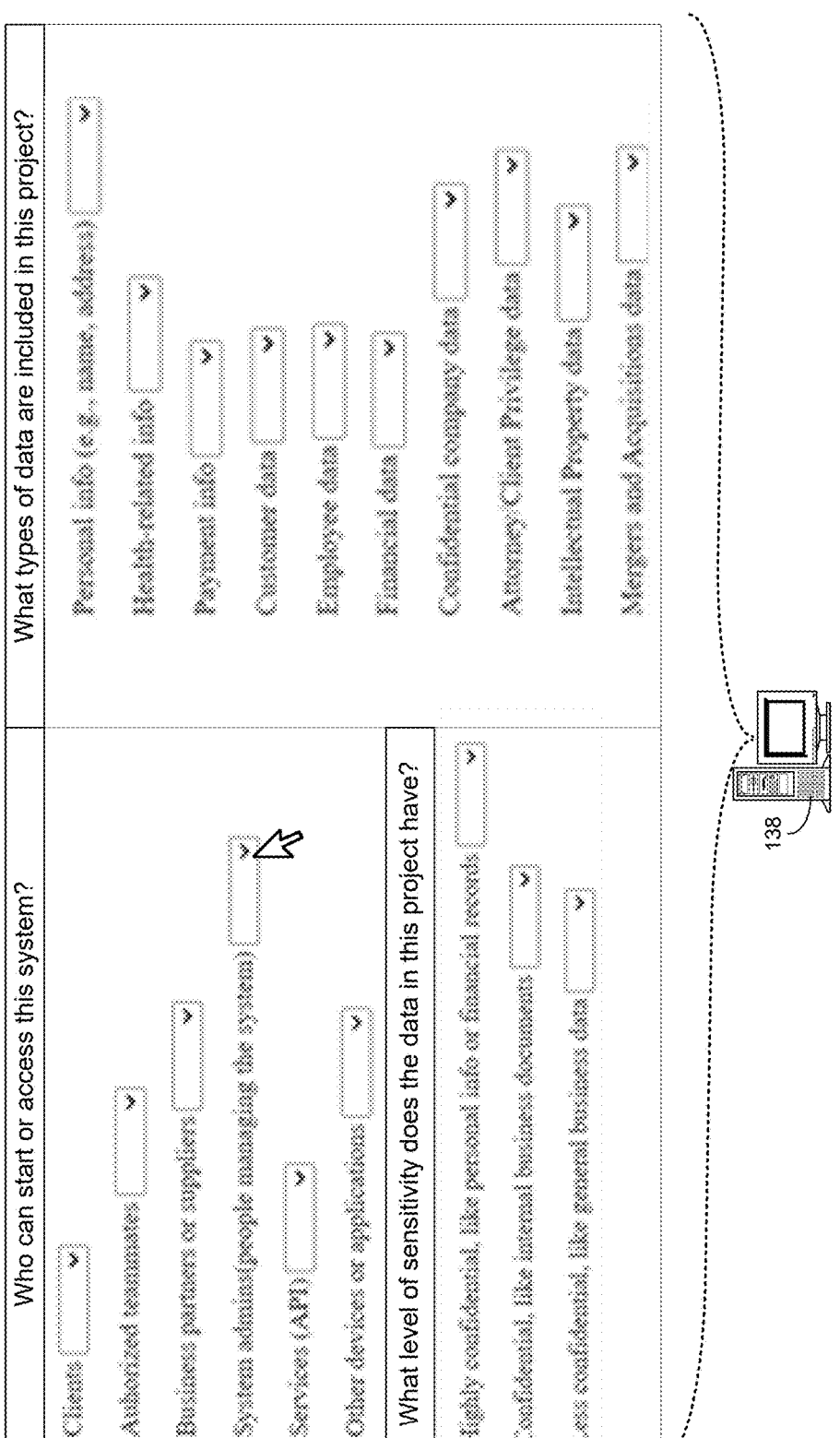
FIG. 4 is an example diagrammatic view of a screen image displayed by a security process according to one or more example implementations of the disclosure.

In some implementations, security process 110 may process 110 may map the user input to a plurality of security policies maintained in a policy repository. For instance, once the answers from FIG. 4 are collected, security process 110 may compare those answers against an internal library of rules and standards (e.g., via a policy source in FIG. 6). This policy source library contains policies that represent regulatory requirements, company security guidelines, and best practices. By mapping each input field to these policies, security process 110 ensures that user answers are automatically transformed into actionable technical requirements.

For instance, in some implementations, a rules engine of security process 110 processes the structured form data and queries a policy repository stored in a relational database. Each user answer is linked to one or more security policies using predefined mapping tables. For instance, if the form indicates the system is internet-facing, the rules engine queries the policy repository for firewall and DMZ requirements. The technical benefit of this approach is traceability: each user choice directly links to an authoritative policy source, ensuring consistency and reducing interpretation errors.

In some implementations, instead of static mapping, a machine learning classifier of security process 110 (trained on past projects and policy updates) dynamically recommends which policies apply. AI models analyze the semantic meaning of the user input and predict the most relevant policies, even when inputs are unusual or ambiguous. For example, if a user describes a novel data-sharing arrangement, security process 110 can still propose encryption and data governance requirements. As policies evolve, the AI learns to capture new patterns without requiring every rule to be hard-coded. In some implementations, an NLP-enhanced pipeline parses free-text inputs (if allowed) and aligns them with security taxonomies. AI-powered entity recognition identifies critical terms such as "cloud storage," "partner access," or "payment processing" and maps them to corresponding policy sets. Thus, users can input less-structured requirements, and security process 110 still identifies matching policies.

In some implementations, mapping may comprise identifying that the application uses an Internet connection and, in response, automatically applying requirements for a firewall and demilitarized zone (DMZ). For instance, suppose the project team indicates in FIG. 4 that their new application will be accessible from the Internet. This response triggers security process 110 to apply protective layers automatically. Specifically, security process 110 mandates the use of a firewall and a DMZ as shown in UI 500 in FIG. 5. A DMZ may generally be described as a controlled buffer area that sits between an organization's internal network and the external Internet (or other untrusted networks). As a result, this ensures that external users cannot directly access sensitive internal systems.

In some implementations, the policy engine of security process 110 cross-references the "internet-facing" input field and appends predefined firewall and DMZ requirements to the requirements set. These are represented as reusable components in component library in FIG. 6. The benefit is automation of well-established security patterns, saving architects from manually checking basic conditions.

In some implementations, an AI-driven network modeling tool of security process 110 evaluates the traffic patterns described in user input and suggests not only a DMZ but also the most efficient firewall configuration (e.g., stateful vs. application-layer filtering). The AI can simulate potential attack vectors and propose optimized placement of these controls. Thus, higher precision is realized, as security blueprints are not generic but adapted to anticipated risks.

In some implementations, security process 110 integrates with external threat intelligence feeds and, based on current vulnerabilities, adjusts DMZ and firewall configurations dynamically. If a surge in attacks targeting a particular port is detected, the generated blueprint automatically includes stricter firewall rules.

In some implementations, mapping may comprise identifying that the application requires an external data feed and, in response, automatically applying requirements for an Application Programming Interface (API) gateway. For instance, when the questionnaire of FIG. 4 indicates that the application must integrate with an external data source, the mapping engine of security process 110 interprets this requirement and selects appropriate safeguards from the policy repository. These safeguards define the use of an API gateway, which acts as a broker for all inbound and outbound traffic between the internal system and the external feed. The gateway ensures that communication is authenticated, encrypted, validated, and logged before data crosses into the secure zone, thereby reducing the risk of compromised or malformed information entering the environment. In the example, a graphical security blueprint (not shown), the gateway is automatically positioned between the external source and the application's integration tier.

In some implementations, the mapping engine of security process 110 triggers on the "external feed" field in the questionnaire and queries the policy repository (the policy source) for gateway requirements. The retrieved policies specify technical controls such as OAuth-based authentication, schema validation, rate limiting, and message logging. These controls are bound to the gateway component selected from the component library and instantiated in the GSB.

Figure 6:
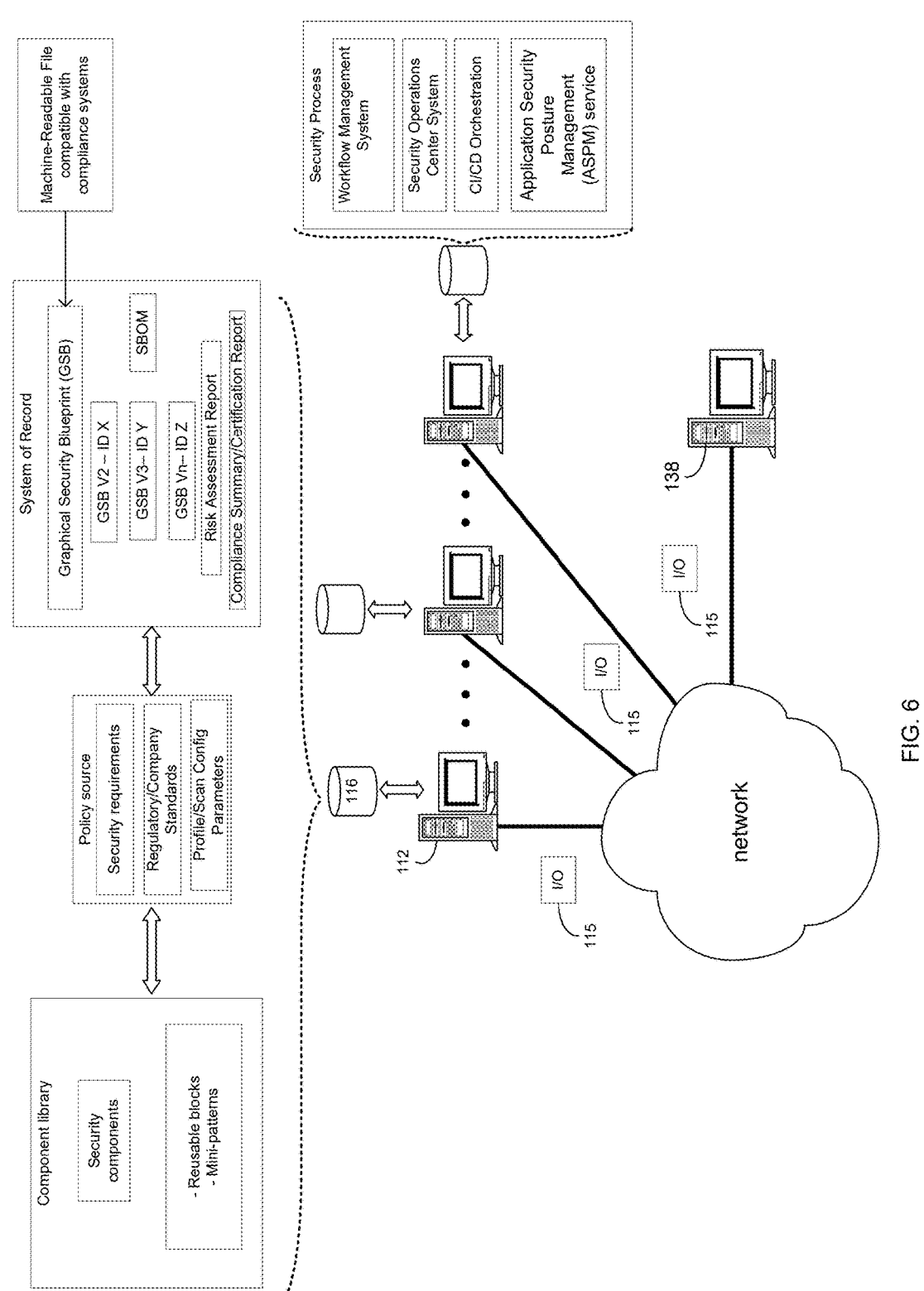
FIG. 6 is an example alternative diagrammatic view of an operating environment used by a security process according to one or more example implementations of the disclosure.

In some implementations, security process 110 draws from a catalog of gateway patterns in a component library in FIG. 6, each designed for a specific integration class. For example, one pattern may be tuned for high-volume third-party APIs, while another may be designed for regulated partner exchanges requiring enhanced audit logging. The appropriate pattern is selected by security process 110 based on metadata in the questionnaire and instantiated into the GSB with configuration parameters adjusted automatically.

In yet another implementation, security process 110 may use AI to analyze the declared data source type and sensitivity. If the source is classified as high risk, such as financial or healthcare data, the AI engine of security process 110 recommends additional layers such as anomaly detection modules or dual-gateway separation for ingress and egress. Conversely, if the feed is publicly available and low sensitivity, the AI engine may recommend a lighter configuration that still enforces integrity checks but reduces processing overhead. This intelligent adjustment tailors gateway protections to the level of risk associated with each external feed.

In some implementations, the plurality of security policies may be dynamically updated from an external policy source (e.g., the policy source). For instance, because security requirements evolve, security process 110 ensures that its repository of policies remains current. The policy repository is designed to synchronize with external sources such as regulatory feeds, industry standards databases, or organizational governance platforms. By continuously refreshing its content, the repository provides the mapping engine with the latest controls, ensuring that newly generated blueprints are aligned with current obligations.

In some implementations, the repository periodically connects to external policy servers over a secure API, retrieves updated control definitions, and stores them with version identifiers. Each update is logged and timestamped, creating an auditable trail of policy evolution. The mapping engine of security process 110 may reference the most recent version when generating new GSBs. In some implementations, the repository adopts an event-driven model where external policy sources push updates directly to the system. A subscription service listens for changes and immediately integrates them into the repository. This allows new policies, such as those addressing emergent vulnerabilities, to be available for mapping without delay.

In yet another implementation, the AI engine of security process 110 monitors a broader set of information streams, including regulatory announcements, vulnerability advisories, and best-practice publications. The AI engine uses natural language processing to extract relevant controls, normalize them into structured policy entries, and flag them for review by administrators before activation (or may be automated without review). This ensures the system rapidly adapts to evolving threats while maintaining oversight and quality control.

In some implementations, security process 110 may generate a set of security requirements based on mapping the user input to the plurality of security policies. For instance, once questionnaire inputs have been mapped to specific policy entries, security process 110 produces a consolidated set of security requirements, shown in the policy source. These requirements form the actionable instructions that define how the application must be secured. Each requirement is tagged with metadata such as compliance references, control descriptions, and implementation guidance.

In some implementations, the requirements generator of security process 110 assembles policy mappings into a structured document, producing both machine-readable output for downstream systems and a human-readable summary for security architects. This ensures that technical and non-technical stakeholders can interpret the results consistently. In some implementations, the requirements are organized hierarchically into categories such as network security, application security, and data protection. This categorization allows reviewers to quickly assess completeness in each domain and provides a structured checklist for auditing. In some implementations, the AI engine of security process 110 prioritizes requirements by assessing historical incident data and threat intelligence feeds. Requirements most critical to reducing organizational risk are highlighted or scheduled with higher urgency in downstream workflows. This adaptive prioritization helps organizations allocate resources effectively while maintaining compliance.

In some implementations, the set of security requirements may include controls for authentication, authorization, and encryption. For instance, core security disciplines such as authentication, authorization, and encryption are consistently represented in the generated requirements. These controls ensure that user identity is verified, access is restricted to approved functions, and sensitive information is protected in transit and at rest.

For example, in some implementations, the requirements engine enforces a baseline template for these three categories. Multifactor authentication, role-based access control, and transport encryption may be automatically applied regardless of other inputs, ensuring that minimum protections are never omitted. In another implementation, security process 110 selects from modular control packages that support different authentication and authorization mechanisms. For example, one module may enforce federated identity with SAML or OIDC, while another applies local credential validation. The correct module is chosen based on the application type.

In some implementations, the AI engine of security process 110 may continuously evaluate recent attack trends and strengthens these controls dynamically. If brute-force login attempts are spiking in the industry, the AI engine may enforce stricter multifactor rules. If new encryption vulnerabilities are disclosed, the AI engine may recommend shifting all TLS requirements to the latest secure version. This ensures that even foundational controls adapt to an evolving threat environment.

In some implementations, security process 110 may assemble, from a component library (e.g., the component library in FIG. 6), a plurality of security components corresponding to the set of security requirements. For instance, once the mapping engine of security process 110 has generated a tailored set of security requirements, security process 110 transitions from abstract obligations to tangible architectural components. At this stage, the security process acts like a design synthesizer: it interprets the requirements and pulls corresponding components from a curated library of security building blocks. Each building block represents a distinct capability, such as a firewall, an intrusion detection appliance, an identity management module, or an encryption service. These components are not mere icons but are defined with attributes, expected behaviors, and policy bindings that allow them to be automatically incorporated into the GSB For instance, in some implementations, the assembly engine of security process 110 maintains an indexed component library where each component is associated with metadata fields such as supported protocols, compliance frameworks, capacity thresholds, and interoperability constraints. When requirements are finalized, the assembly engine queries the component library to identify components that satisfy each requirement. For example, if the requirement specifies multi-factor authentication, the component engine retrieves an identity provider component that is pre-configured for federated login and adaptive challenge policies. These retrieved components are then instantiated within the blueprint's underlying graph data structure, with their metadata linked to the originating requirements for traceability. This ensures that every control requirement has a corresponding technical embodiment and that reviewers can trace each component back to the requirement it fulfills.

In some implementations, the assembly engine uses a staged approach where components are initially added to the blueprint as vendor-neutral abstractions. At this stage, the blueprint reflects functions like "firewall" or "web application gateway" without committing to a specific product or technology. These abstractions are defined with generalized attributes and interfaces, making them portable across different deployment contexts. Later, during deployment or integration, these neutral placeholders can be mapped to concrete vendor implementations through a resolution process that considers organizational standards, procurement preferences, or performance requirements. This approach allows blueprints to serve as authoritative architectural documents while remaining adaptable to evolving infrastructure choices.

In some implementations, AI may play a role in selecting and tailoring components. An AI recommendation engine of security process 110 analyzes historical blueprint data, performance metrics, and contextual information about the new application, such as expected traffic volume, data sensitivity, and integration points, to recommend the most suitable variant of a component. For instance, the AI recommendation engine might determine that a high-throughput firewall cluster is appropriate for a public-facing banking application, while a lightweight virtual firewall suffices for an internal administrative tool. The AI recommendation engine may also optimize component placement within the blueprint by analyzing dependency graphs to minimize latency or by suggesting additional redundancy in high-risk pathways. By embedding AI into the assembly process, security process 110 not only ensures compliance with requirements but also adapts the technical design to operational realities and evolving threats. Through these embodiments, the assembly stage transforms policy-driven requirements into a living architectural model. This ensures that the resulting security blueprint is both actionable and technically aligned with the application's operational context, bridging the gap between abstract policy language and deployable design.

In some implementations, assembling the plurality of security components may comprise creating reusable blocks and mini-patterns stored in the component library. For instance, beyond individual components, security process 110 can assemble predefined clusters of components known as mini-patterns. These mini-patterns function as reusable architectural fragments that capture common security scenarios. Instead of manually piecing together a firewall, intrusion prevention system, and web gateway every time an Internet-facing application is identified, the assembly engine of security process 110 can retrieve a mini-pattern representing a complete perimeter protection structure. The use of mini-patterns accelerates blueprint generation, enforces uniformity, and reduces the cognitive burden on architects by embedding expertise directly into the component library.

For example, in some implementations, mini-patterns are curated and approved by security architects who distill complex arrangements of components into standardized templates. As shown in the example UI 500 in FIG. 5, the results of the questionnaire from FIG. 4 shown in an easy to read template that can be either approved or disapproved by security architects. Each mini-pattern is annotated with conditions for use, such as "apply when Internet access is true" or "apply when external data feed is required." When the assembly engine processes a new set of requirements, it matches these conditions and automatically instantiates the corresponding mini-pattern into the blueprint. This ensures that proven architectures are consistently applied without requiring repeated manual design decisions.

In some implementations, mini-patterns are parameterized, allowing them to be adapted for different project contexts while maintaining a consistent structure. For example, a perimeter mini-pattern may include adjustable parameters for firewall throughput, logging destinations, or encryption standards. When instantiating the pattern, the assembly engine binds values from the questionnaire responses or organizational defaults to these parameters, creating a customized yet standardized architecture. This approach combines efficiency with adaptability, ensuring that the same high-level design can be deployed in multiple contexts without compromising alignment to organizational standards.

In some implementations, AI enhances the mini-pattern lifecycle by identifying recurring arrangements across previously generated blueprints and automatically proposing them as candidates for new patterns. The AI engine of security process 110 analyzes stored blueprints, clusters them by structural similarity, and detects common combinations of components that appear frequently. These combinations are then packaged into mini-patterns and added to the library for reuse in future projects. Over time, this AI-assisted learning process evolves the library, making it more representative of actual organizational practices and emerging architectural needs.

Through these example embodiments, the use of reusable blocks and mini-patterns transforms the assembly process from a case-by-case exercise into a scalable and continuously improving design methodology. This ensures that each blueprint not only satisfies requirements but also reflects accumulated expertise and best practices.

In some implementations, the mini-patterns may represent security architectures for standardized application types. For instance, mini-patterns are not limited to arbitrary combinations of security components; they may also embody complete architectures that are tailored to well-recognized categories of applications. Security process 110 may rely on standardized application types that share common risk profiles and compliance obligations. For example, an online banking portal requires stringent perimeter defenses, strong authentication, and continuous monitoring, whereas a customer-facing e-commerce site requires secure payment handling, web application firewalls, and data encryption safeguards. By encoding these architectures into mini-patterns, security process 110 allows new projects of similar type to begin with a hardened and regulation-ready design from the outset.

In some implementations, the component library includes mini-patterns that are aligned with specific regulatory frameworks. A financial application type mini-pattern may embed controls consistent with payment card security standards, such as segmentation of cardholder data environments and the inclusion of network intrusion detection sensors. A healthcare application type mini-pattern may incorporate access logging, data anonymization components, and encryption services that reflect health privacy regulations. When a user identifies their project as belonging to one of these categories in the questionnaire of FIG. 4, security process 110 automatically instantiates the corresponding mini-pattern in the blueprint. This embodiment ensures compliance by default and relieves designers from manually translating regulatory frameworks into technical architectures.

In some implementations, the mini-patterns evolve over time based on operational experience and audit findings. Each time a project undergoes a security assessment or a compliance audit, feedback is captured and adjustments are made to the relevant mini-patterns. If a recurring weakness is identified, such as insufficient logging coverage, the pattern is updated so that future blueprints for that application type automatically include enhanced logging controls. This creates a living repository of standardized architectures that reflect both regulatory requirements and organizational lessons learned.

In some implementations, AI assists in the recognition and refinement of standardized patterns. By analyzing stored blueprints across many projects, the AI engine of security process 110 can cluster them according to shared characteristics such as external exposure, data sensitivity, or transaction type. These clusters reveal archetypes of applications that naturally align with distinct security architectures. The AI engine then synthesizes these findings into proposed mini-patterns, which are reviewed and added to the library. Over time, this process not only codifies existing standards but also detects emerging categories of applications, ensuring that the library keeps pace with innovation. Thus, mini-patterns representing standardized application types become a cornerstone of the system. They provide a direct link between regulatory and operational requirements on one hand, and technical blueprint design on the other, enabling rapid, consistent, and compliant architecture generation.

In some implementations, security process 110 may generate a graphical security blueprint by interconnecting the plurality of security components according to pre-approved dataflows. For example, after components and mini-patterns are selected and assembled, security process 110 produces a graphical representation of the complete security architecture. This graphical security blueprint depicts not only the individual components but also the pathways through which data flows between them. The interconnections are governed by a catalog of pre-approved dataflows that specify how information is permitted to travel between zones, services, and external entities. By constraining connectivity to these vetted pathways, the GSB ensures that designs do not introduce unauthorized or risky channels of communication.

For instance, in some implementations, the blueprint is constructed using an internal graph model in which each node represents a component and each edge represents a dataflow. The assembly engine references a policy store of approved communication patterns, such as "Internet zone to DMZ via firewall" or "DMZ to application tier via API gateway." In some implementations, only connections that match these patterns are instantiated. Once the model is complete, a rendering module translates it into a visual diagram, arranging nodes according to layered security zones and labeling edges with protocol and control information. This ensures that the blueprint is both machine-verifiable and human-readable.

In some implementations, security process 110 uses a layout engine that automatically arranges components and dataflows to highlight security zones, trust boundaries, and inspection points. Components such as firewalls or gateways are deliberately placed at boundaries between zones, while sensitive stores are positioned deep within protected layers. The visual output is generated in scalable formats such as vector graphics or PDF so that it can be easily shared, embedded in documentation, or integrated with enterprise modeling tools. This embodiment provides clarity, consistency, and portability of the design across the organization.

In some implementations, AI enhances the generation process by analyzing the draft topology and recommending optimizations. The AI engine of security process 110 may identify potential bottlenecks in dataflows, suggest redundancy where critical services have single points of failure, or propose additional monitoring flows for high-risk connections. The AI engine may also learn from prior blueprint reviews, adjusting future layouts to highlight areas that frequently receive scrutiny from auditors or architects. By incorporating AI, the GSB becomes not only a static diagram but a dynamic design aid that adapts to context and improves resilience. The generation of the graphical blueprint translates abstract requirements and component selections into a comprehensive architectural artifact, capturing both structure and flow, ensuring that designs are visually clear, policy-compliant, and technically optimized.

In some implementations, the graphical security blueprint may be generated as a machine-readable file compatible with compliance systems. For instance, in addition to producing a human-readable diagram, security process 110 encodes the blueprint as a machine-readable artifact that can be ingested by compliance platforms. This dual-format output ensures that the blueprint can serve both as a visual communication tool for architects and as a structured dataset for automated governance. By enabling automated compliance checks, security process 110 eliminates manual transcription errors and accelerates audit readiness.

For instance, in some implementations, the blueprint is exported in structured data formats such as XML or JSON that adhere to schemas recognized by compliance verification tools. Each component and dataflow in the blueprint is annotated with metadata tags that reference the underlying policies and regulatory controls they fulfill. Compliance systems of security process 110 can then parse the file, match the annotations against control catalogs, and verify adherence automatically.

In some implementations, security process 110 transmits the blueprint directly to compliance systems via secure application programming interfaces. Instead of producing a static file, security process 110 uses APIs to synchronize blueprints continuously, ensuring that compliance platforms always have access to the latest version. This approach minimizes latency between design changes and compliance validation and ensures that regulatory obligations are enforced in near real time.

In some implementations, the AI engine of security process 110 dynamically adapts the export format based on the target compliance system. The AI engine recognizes the capabilities and schema of the receiving platform, reformats the blueprint accordingly, and validates compatibility before transmission. By learning from prior export failures or mismatches, the AI engine continually improves the fidelity of the integration, allowing organizations with heterogeneous compliance systems to maintain a consistent design-to-audit pipeline.

In some implementations, security process 110 may store the graphical security blueprint and associated metadata in a system of record (e.g., shown in FIG. 6), and in some implementations, security process 110 may assign an application identifier to the graphical security blueprint for indexing in the system of record. For instance, once created, the GSB and all of its associated metadata are archived in a system of record. This repository functions as the authoritative source of truth for security designs, ensuring that every blueprint can be retrieved, reviewed, and audited over the lifecycle of the application. To enable efficient indexing and retrieval, each blueprint is assigned a unique application identifier (e.g., ID X, ID Y, ID Z, etc.) that links the blueprint to its corresponding project or system.

In some implementations, the blueprint and metadata are stored in a structured repository, where indexing supports queries by application identifier, project owner, version, or date of creation. Metadata fields may include not only the technical components but also contextual information such as the risk classification, applicable regulatory frameworks, and approval status. This structured storage provides a powerful audit trail and simplifies search operations.

In some implementations, the repository is implemented using immutable append-only storage such as a blockchain ledger. Each blueprint and its metadata are committed as a block, with cryptographic hash chaining ensuring that no historical record can be tampered with. This embodiment is particularly beneficial for industries that demand provable integrity of security documentation, such as financial services or healthcare.

In some implementations, the AI engine of security process 110 enriches the metadata automatically before storage. For example, the AI engine may tag the blueprint with descriptors like "external-facing," "multi-tier," or "sensitive-data-handling," inferred from the design itself. These intelligent tags enable faster and more nuanced search and retrieval, as well as analytics that reveal organizational trends across stored blueprints.

In some implementations, storing may comprise versioning successive drafts of the graphical security blueprint. For instance, because applications evolve, blueprints often require modification. To capture this evolution, security process 110 maintains successive drafts, each stored as a distinct version (e.g., V1, V2, etc.) with complete metadata. This versioning allows stakeholders to track design changes over time, compare prior drafts, and roll back if necessary.

In some implementations, security process 110 assigns sequential identifiers to each draft and links them through a parent-child lineage structure. Metadata for each version includes author, timestamp, and a description of the changes made. This ensures traceability and accountability for all design decisions. In some implementations, the repository maintains differential records that capture only the changes between versions rather than duplicating the entire blueprint each time. Earlier drafts can be reconstructed on demand by applying stored differences to a baseline version. This embodiment optimizes storage usage while retaining full historical visibility.

In some implementations, the AI engine of security process 110 automatically generates summaries of the differences between versions. For instance, the AI engine might highlight that "a web application firewall was added to the DMZ" or that "encryption standard was upgraded from TLS 1.2 to TLS 1.3." These natural language summaries reduce review time and help stakeholders quickly understand the significance of changes.

In some implementations, security process 110 may dynamically update the graphical security blueprint in response to changes in one or more of the plurality of security policies. For instance, stored blueprints are not static artifacts; they evolve as security policies change. When regulatory requirements or organizational standards are updated, security process 110 ensures that existing blueprints are refreshed to remain aligned with the new obligations. This dynamic updating reduces the risk of drift between approved policy and actual design.

For example, in some implementations, security process 110 periodically polls the policy repository for updates. When a new or modified policy is detected, the mapping engine recalculates which components and dataflows are affected. It then regenerates the impacted sections of the blueprint and stores the updated draft as a new version in the system of record. This ensures that changes are systematically applied without manual oversight.

In some implementations, security process 110 subscribes to an event-driven feed of policy updates. Whenever a new requirement is published, an event is triggered that prompts immediate recalculation and blueprint regeneration. Affected blueprints are updated in real time, and stakeholders are notified of the modifications. This ensures near-instantaneous alignment between design and policy. In some implementations, the AI engine of security process 110 analyzes the scope and impact of policy updates before applying them. The AI engine evaluates the dependency graph of components across stored blueprints to predict which applications are most affected. It then prioritizes updates based on risk, ensuring that high-impact changes such as new encryption mandates are applied before less critical updates. This intelligent prioritization minimizes disruption while ensuring comprehensive coverage.

In some implementations, security process 110 may export the set of security requirements into a workflow management system in FIG. 6. For instance, after the blueprint is generated (e.g., via the questionnaire results from I/O 115), the identified security requirements should be acted upon by engineering and operations teams. To make these requirements actionable, security process 110 exports them into workflow management platforms where they are tracked as tasks. This linkage ensures that the abstract controls captured in the blueprint directly drive concrete implementation work.

For example, in some implementations, the requirements are serialized into structured task objects and transmitted through secure APIs to the organization's workflow management system. Each requirement becomes a ticket that includes contextual metadata such as originating application ID, risk priority, and due dates. This embodiment provides end-to-end traceability from the questionnaire inputs of FIG. 4 through to the engineering execution. In some implementations, requirements are broadcast over enterprise message queues (e.g., via I/O 115) to multiple workflow systems simultaneously. Large organizations may rely on different project management platforms across teams, and this approach ensures consistency by synchronizing requirements across all systems. Each system subscribes to the feed and translates requirements into its own native task structure.

In yet another implementation, the AI engine of security process 110 enriches the export process by prioritizing requirements based on relative risk and historical bottlenecks. The AI engine may assign higher urgency to encryption or access control requirements, while scheduling less critical requirements for later implementation. This allows limited engineering resources to be allocated efficiently while still satisfying compliance obligations.

In some implementations, security process 110 may validate the graphical security blueprint against regulatory standards (e.g., via the policy source). For instance, validation is beneficial before an application can proceed to deployment. The generated GSB may be systematically checked against regulatory standards and internal benchmarks to confirm compliance. This validation ensures that the blueprint is not only structurally correct but also legally and operationally sufficient.

For example, in some implementations, the validation engine of security process 110 cross-references each component and dataflow in the GSB against a control catalog derived from regulations, such as PCI DSS, HIPAA, or ISO 27001. Any missing or misaligned controls are flagged, and a remediation notice is attached to the blueprint record. In some implementations, validation occurs through direct queries to external compliance databases. Security process 110 leverages APIs to confirm that controls embedded in the blueprint conform to the latest regulatory requirements, thereby minimizing reliance on outdated checklists. This real-time validation accelerates audit readiness.

In some implementations, the AI engine of security process 110 compares the blueprint against historical compliance failures across the organization. The AI engine identifies patterns of recurring deficiencies and proactively recommends corrective measures before submission for audit. This predictive approach reduces the likelihood of repeated errors and strengthens overall compliance posture.

In some implementations, security process 110 may generate a risk assessment report associated with the graphical security blueprint. For instance, beyond compliance validation, security process 110 produces a comprehensive risk assessment report to guide decision-makers. This report highlights vulnerabilities, assigns severity scores, and recommends mitigation strategies based on the generated blueprint. It transforms the blueprint from a static architectural diagram into a dynamic risk management tool.

For example, in some implementations, the report is derived directly from the blueprint topology. External interfaces, sensitive data stores, and privileged access pathways are automatically identified as high-risk elements. Each is assigned a severity score, and remediation steps are linked to specific controls in the component library. In some implementations, the risk assessment report integrates threat intelligence feeds. If a vulnerability is discovered in a class of components used in the blueprint, for example, a known weakness in a particular API gateway, the risk score for that component is automatically raised. This ensures that the report reflects current threat conditions.

In some implementations, the AI engine of security process 110 simulates potential attack scenarios by analyzing the blueprint graph as if it were a target network. The AI engine evaluates paths an attacker might take to escalate privileges or exfiltrate data and produces a ranked list of likely attack vectors. It then recommends additional safeguards to break these paths, providing forward-looking insight into how the blueprint might be exploited in practice.

In some implementations, the graphical security blueprint may be made accessible for approval. For instance, as shown in the example implementation of FIG. 5 with UI 500, before an application moves toward deployment, stakeholders such as security architects, compliance managers, and business owners may review and approve the SBP. Security process 110 therefore provides mechanisms for controlled access, commentary, and formal sign-off.

For example, in some implementations, the blueprint is published to a secure portal with role-based access control. Reviewers can view the graphical design, inspect the linked requirements, and attach annotations or questions. Once satisfied, reviewers register their approval, which is stored with the blueprint record for audit purposes. In some implementations, approval workflows are integrated directly into enterprise governance platforms. In the example, the blueprint does not advance to the change management stage until electronic signatures from designated roles are collected, ensuring governance discipline and prevents unauthorized progress.

In yet another implementation, the AI engine of security process 110 may analyze approval histories to identify bottlenecks and inefficiencies in the review process. If the AI engine detects that certain types of requirements consistently delay approval, it may recommend pre-validation steps or enhanced automation to streamline future reviews, improving governance efficiency without compromising oversight.

In some implementations, security process 110 may integrate the graphical security blueprint with a downstream system for automated change management. For instance, the blueprint is not simply stored as a static artifact; it is integrated into systems that manage infrastructure changes. This integration ensures that the approved design directly informs operational implementation, closing the loop between architectural intent and real-world deployment.

For instance, in some implementations, the blueprint specifications are exported into change management platforms. Each required adjustment, such as adding a firewall rule or enabling encryption, is logged as a change record. These records are scheduled, executed, and tracked according to enterprise change management procedures. This guarantees traceability from design decision to operational action. In another implementation, the GSB feeds directly into continuous deployment pipelines. Security process 110 translates blueprint components into infrastructure-as-code templates, which are versioned and deployed automatically. This embodiment accelerates adoption by eliminating manual re-interpretation of the blueprint during deployment.

In yet another implementation, the AI engine of security process 110 continuously monitors production environments and compares them against the approved blueprint. If the AI engine detects divergence, such as a missing control or an unauthorized configuration change, it can trigger automated remediation workflows or escalate alerts to administrators, ensuring that the deployed environment remains consistent with the approved GSB over time, even as systems evolve.

The Security Process:

Organizations increasingly rely on software developed by third-party vendors, open-source communities, and con-tracted developers. While such external code accelerates development, it also introduces significant security risks that are difficult to assess and manage. In particular, when an organization receives software from a vendor, the organization has little visibility into whether the vendor's development practices comply with recognized security frameworks such as OWASP, NIST Secure Software Development Framework (SSDF), or other "secure by design" standards.

It may be possible to configure and alter existing Application Security Posture Management (ASPM) and CI/CD pipeline tools perform internal code scanning and policy enforcement for security defects, accessibility issues, and code compliance; however, these tools are primarily designed for in-house use and do not provide a standardized or independently verifiable means for a vendor to demonstrate to customers that its software has passed accepted security checks. More particularly, such existing tools, if provided to the customer, could reveal a vendor's confidential source code, system configurations, or other sensitive intellectual property that vendors are often unwilling to share, and as a result, vendors do not provide such a report to customers. Thus, the customers cannot easily validate whether a vendor's software has been securely developed or remediated prior to deployment. This lack of transparency creates friction in procurement and compliance processes. Customers may require vendors to manually attest to security practices in contracts or perform redundant testing, leading to duplicative effort, inconsistent assurance, and reduced trust between parties. Moreover, there is no industry-standard mechanism comparable to the Payment Card Industry (PCI) Approved Scanning Vendor (ASV) program, which provides independent validation of network security compliance, and no such equivalent is known to exist at the application layer, where code-level vulnerabilities are most prevalent.

Therefore, as will be discussed in greater detail below, the present disclosure enables a standardized, automated certification mechanism that can be integrated directly within CI/CD pipelines or ASPM platforms to enforce execution of industry-standard security scans using non-modifiable profiles, automatically verify remediation of high-severity vulnerabilities, and generate a sanitized certification report suitable for transmission to customers. Such a system would allow vendors to provide proof of compliance with recognized security standards while maintaining confidentiality of underlying scan data. At the same time, it would enable customers to efficiently assess and trust the security posture of vendor-supplied applications without requiring deep inspection of proprietary code.

As discussed above and referring also at least to the example implementations of FIGS. 3-7, security process 110 may receive 300, by a computing device, an indication that a software component is to be released for delivery to a customer. Security process 110 may select 302 a predefined and non-modifiable industry-standard security profile defining one or more security scans to be executed in accordance with at least one of an application-security framework and a secure-development standard. Security process 110 may execute 304 the one or more security scans against the software component using the predefined and non-modifiable industry-standard security profile to identify one or more vulnerabilities. Security process 110 may determine 306 that the one or more vulnerabilities that exceeds a remediation threshold has been remediated. Security process 110 may generate 308 a certification report that includes a sanitized summary of the one or more security-scans results that omits source code, configuration data, and raw vulnerability details from results of the one or more security scan in response to determining that the one or more vulnerabilities that exceeds the remediation threshold has been remediated. Security process 110 may transmit 310 the certification report with the sanitized summary to the customer to evidence compliance of the software component with the predefined industry-standard security profile.

In some implementations, security process 110 may receive 300, by a computing device, an indication that a software component is to be released for delivery to a customer. For instance, security process 110 may operate within a vendor's continuous integration and delivery (CI/CD) environment, as shown generally in FIGS. 4-6. When a development team finishes a new version of its application (or software component of the application), security process 110 may automatically generate an indication that the software component is ready for release. This indication may occur when a developer merges a code branch into the main repository or when a build passes all automated functional and unit tests, etc. At that point, security process 110 recognizes that the build is entering the release phase and initiates a certification workflow to verify that the code satisfies the organization's or customer's security requirements before delivery. This ensures that no unverified or insecure build is transferred to the customer without a standardized compliance check.

In some implementations, a CI/CD orchestration server of security process 110 communicates with security process 110 through an internal application programming interface (API). The orchestration server sends a structured message, such as a JSON payload, indicating metadata about the build, its identifier, repository URL, version number, and target environment. Security process 110 parses the payload and records an entry in its internal workflow database, marking the build as "pending certification." The trigger can originate from build-completion events or deployment-stage hooks within the CI/CD pipeline. From a hardware standpoint, the computing device executing security process 110 may be a virtualized server node hosted in a secure container cluster, connected through an enterprise network to source-control repositories and build servers. This approach enables a hands-free initiation of the certification process, reducing human error and ensuring that every release candidate undergoes a uniform security verification before customer delivery.

In some implementations, the indication is received via a web-based submission portal similar to the user interface shown in FIG. 4, but rather than entering project requirements, a project manager or quality-assurance lead may instead manually select the software component from a dropdown list and confirms that it is ready for customer delivery. The portal generates a digital notification, which is transmitted through a message bus or event stream (for example, using REST or publish/subscribe protocols) to security process 110. The process then begins the same certification workflow as noted above and discussed in greater detail further below, but the trigger is manual rather than automatic. This provides flexibility for smaller vendors or those without automated pipelines, allowing human oversight while maintaining traceability and audit control.

In some implementations, security process 110 may select 302 a predefined and non-modifiable industry-standard security profile defining one or more security scans to be executed in accordance with at least one of an application-security framework and a secure-development standard. For instance, after security process 110 receives the indication that the software component is ready for delivery, it automatically selects a predefined security profile that establishes what tests must be performed before certification can occur. This profile represents an independent and recognized set of rules, such as those outlined by industry security frameworks, ensuring that every vendor's software is evaluated by the same objective criteria. The non-modifiable nature of the profile means the developer or vendor cannot alter its contents, scan depth, or thresholds, thereby preventing manipulation of the results. Within the same scenario as noted above, security process 110 effectively locks in the appropriate industry-standard policy before executing any scans, guaranteeing that each evaluation remains consistent and verifiable across all vendors and software components.

In some implementations, security process 110 maintains a policy repository (as shown in FIG. 6) as a secure database containing pre-approved profiles derived from standardized security frameworks such as OWASP or NIST SSDF. Upon recognizing that a build requires certification, security process 110 queries the repository to identify the relevant profile based on metadata received with the build (for example, application type, language, or deployment environment, as may have been entered via UI 400, for example). The profile defines parameters such as the categories of vulnerabilities to scan for, thresholds for acceptable severity levels, and mappings to external compliance controls. Once selected, the profile is assigned a unique version identifier and stored in an immutable state within the certification record, ensuring it cannot be edited or replaced by the user. This guarantees audit integrity and uniformity of results, as every certified component is evaluated under the same immutable rule set, eliminating vendor bias and improving comparability across software submissions.

In some implementations, the selection occurs dynamically through integration with an external policy service or compliance gateway. Here, security process 110 connects to a network endpoint hosting current versions of standardized security configurations. The endpoint returns a digitally signed policy bundle that defines the exact scanning profile to be used, and the bundle is imported into a sandboxed environment where its integrity is verified via checksum validation before execution. Vendors have no ability to alter or substitute this configuration once retrieved, and by sourcing profiles from a network-based authority, security process 110 ensures real-time synchronization with evolving industry standards and eliminates the need for local maintenance of compliance rules.

In some implementations, organizations may be allowed to implement a tiered policy selection mechanism. For example, lightweight profiles may be used for early development testing, while full compliance profiles are mandated at release. The system enforces the correct tier by correlating it with pipeline stage identifiers (e.g., "staging," "production"). The pipeline automatically invokes the appropriate non-modifiable profile when the component enters the certification phase, which optimizes performance and resource use during development while still maintaining rigorous, unalterable compliance checks at the release stage.

In some implementations, the predefined industry-standard security profile may be based on at least one of Open Web Application Security Project (OWASP) framework and National Institute of Standards and Technology (NIST) Secure Software Development Framework (SSDF), and in some implementations, security process 110 may automatically import 312 the industry-standard security profiles from one of a network source hosting current OWASP and NIST control definitions. For instance, once security process 110 identifies that a certification profile is required, it references standardized frameworks such as the OWASP Application Security Verification Standard (ASVS) and the NIST Secure Software Development Framework (SSDF). These frameworks collectively define what constitutes a secure application and how security should be validated during development. The OWASP framework provides detailed requirements for web and application security, covering topics such as authentication, data validation, session management, encryption, and input handling, while the NIST SSDF provides procedural guidance for integrating security practices into each phase of software development, from planning and design to testing and release. By basing its profiles on these established frameworks, security process 110 ensures that the resulting scans reflect recognized best practices. Furthermore, security process 110 can automatically import updated control definitions (e.g., into the policy datastore in FIG. 6) or rule sets from trusted network repositories maintained by the organizations that publish OWASP and NIST standards. This automatic import keeps the scanning profiles synchronized with the most current security expectations, ensuring continuous compliance even as threats and standards evolve.

For example, in some implementations, security process 110 periodically connects to official repositories or authorized mirrors that host machine-readable versions of the OWASP ASVS and NIST SSDF control sets. These repositories may expose an application programming interface (API) that allows automated retrieval of structured data in JSON or XML format. The imported content may include detailed control descriptions, recommended test procedures, references to specific vulnerability categories (for example, injection flaws, insecure deserialization, or weak cryptographic storage), and mappings to software development activities. Upon import, security process 110 parses the control definitions and generates internal "security profiles," which are sets of executable scanning parameters. Each profile can include scanning depth levels, inclusion or exclusion lists, severity weightings, and thresholds that map to OWASP and NIST controls. The profile may also specify corresponding automated tests, such as static code analysis for injection attacks or dependency checks for outdated libraries, which creates a direct linkage between formal security frameworks and executable scan policies, ensuring traceability and accuracy in verifying compliance against industry standards.

In some implementations, security process 110 uses a federated configuration management service that aggregates updates from multiple standards bodies, not just OWASP and NIST. When new control versions are released, the service distributes signed configuration packages to all registered ASPM instances. Each package contains rule identifiers, control metadata, and recommended remediation logic. Security process 110 verifies the digital signature before applying any updates, ensuring the authenticity and integrity of imported profiles. The updated profiles automatically replace prior versions in the local repository without manual intervention, while older versions remain archived for audit purposes. This ensures all vendors remain aligned with the latest compliance expectations and eliminates delays associated with manual policy updates, thereby reducing exposure to newly discovered vulnerabilities.

In some implementations, an organization may be allowed to maintain a hybrid profile that merges controls from both OWASP and NIST sources. For example, OWASP's ASVS Level 2 requirements might be combined with NIST SSDF's guidance on secure configuration management and change control. The resulting profile is compiled into a single enforcement policy that directs how and when each control is checked during the scanning process. Security process 110's configuration engine correlates equivalent or overlapping rules to avoid redundancy, producing an optimized and harmonized scan profile. This ensures that the most relevant controls from multiple frameworks are applied cohesively, offering stronger and more efficient coverage across both procedural and technical aspects of application security.

In some implementations, security process 110 may execute 304 the one or more security scans against the software component using the predefined and non-modifiable industry-standard security profile to identify one or more vulnerabilities. For instance, after importing and locking the appropriate OWASP or NIST-based profile, security process 110 proceeds to execute the security scans defined in that profile (e.g., stored in the policy datastore). In the ongoing vendor-certification scenario, this means that before a software component is released to the customer, security process 110 automatically runs a full suite of standardized scans to uncover vulnerabilities such as insecure data handling, improper authentication, or outdated dependencies. These scans are governed entirely by the selected industry-standard profile, developers cannot alter thresholds, skip categories, or reduce the level of scrutiny. As shown in FIG. 6, execution may be handled by the workflow management system in coordination with a component library and policy source, ensuring that every build undergoes the same rigorous evaluation. The resulting findings provide a factual basis for later certification, ensuring customers receive applications that have been checked against a transparent, industry-recognized benchmark.

For example, in some implementations, security process 110 orchestrates a combination of static and dynamic scans using modular plug-ins. The static analysis engine parses source and configuration files, applying rule sets specified in the imported security profile to detect coding patterns associated with common weaknesses such as injection vectors or unsafe deserialization. A dynamic analysis engine then launches a compiled build in a sandboxed container and simulates user interactions to uncover runtime issues like improper session termination or insecure redirects. All scan modules report standardized metrics back to a central results database through REST-based APIs, where a correlation service of security process 110 consolidates duplicate findings and assigns each vulnerability a severity value defined by the industry profile. The scan workload may be distributed across multiple compute nodes or containers to accelerate processing. This integrated, automated execution guarantees uniform coverage of vulnerabilities across all components and enforces compliance without developer intervention, improving both accuracy and efficiency compared to ad hoc or manually configured scans.

In some implementations, the scans are executed within a cloud-hosted scanning environment managed by an external compliance provider of security process 110. Security process 110 sends a signed request containing build metadata and a reference to the applicable profile. The cloud service provisions isolated scanning environments for each request, executes the full set of checks, and streams back normalized results in an encrypted format. Because the scan definitions are controlled by the remote provider, the vendor cannot influence scope or configuration. As such, this model offers scalability for large vendor ecosystems and ensures independence, as scans are conducted on infrastructure separated from the vendor's own development systems, enhancing trust in the certification results.

In some implementations, security process 110 may employ an on-premises parallel scanning fabric. Multiple lightweight agents installed on internal build servers each perform a subset of tests dictated by the industry-standard profile, reporting results to a central aggregation hub. This distributed design allows high-volume scanning without overloading a single node and enables continuous feedback during the build process, and distributing scan execution reduces processing time while maintaining full compliance with the locked profile, enabling rapid yet controlled certification cycles for frequent software releases.

In some implementations, executing the one or more security scans may comprise invoking 314 a third-party Application Security Posture Management (ASPM) service that enforces the industry-standard security profile, and in some implementations, executing the one or more security scans may include performing 316 the one or more security scans using one of static application security testing (SAST), dynamic application security testing (DAST), and software composition analysis (SCA) techniques. For instance, when security process 110 runs the above-noted scans, it can either perform them internally or call upon an external Application Security Posture Management (ASPM) service of security process 110. This third-party service acts as an independent enforcement layer that applies the same predefined OWASP- or NIST-based security profile but executes the scans in a controlled and impartial environment. The service may integrate directly into the vendor's (or customer's) CI/CD pipeline or operate remotely through secure APIs. Within this process, several complementary testing methodologies can be applied, such as SAST inspects the source code and configuration files without execution, DAST analyzes the running application to uncover real-time vulnerabilities, and SCA identifies risks in third-party libraries or open-source components. By combining these techniques through an ASPM service that enforces an immutable standard, the system ensures thorough, consistent, and verifiable assessment of the software component before any certification report is generated.

For example, in some implementations, security process 110 connects to a trusted third-party ASPM service through a secure RESTful API. Upon receiving a trigger event, the process sends a digitally signed request containing build metadata, the software artifact (or a secure pointer to its repository), and an identifier for the applicable industry-standard profile. The ASPM service retrieves the appropriate scan configuration from its managed catalog and sequentially executes SAST, DAST, and SCA operations. For SAST, the service employs language-specific parsers and static analyzers to identify syntax-level vulnerabilities such as buffer overflows or improper input validation. For DAST, it deploys the compiled application in an instrumented sandbox, monitoring network requests, session handling, and authentication logic. For SCA, it cross-references all package dependencies against a continuously updated vulnerability database to identify known exploits or outdated components. All results are normalized into a common schema and returned to security process 110 through the same secure API. This approach enables vendors to leverage independent infrastructure that enforces the exact same industry-standard profiles, thereby eliminating bias and enhancing the credibility of the certification process while minimizing the vendor's internal resource load.

In some implementations, security process 110 integrates the ASPM enforcement logic directly within an organization's private cloud environment. Here, containerized scanning engines corresponding to SAST, DAST, and SCA are orchestrated by a local policy controller that mirrors the rule definitions of the external service. The controller continuously synchronizes profile updates from the external ASPM provider through encrypted channels to ensure consistency with global security definitions. Each container executes its respective scan type in parallel, and results are merged into a unified vulnerability dataset for later reporting. This maintains strict compliance with the industry-standard security profiles while keeping sensitive code and data within the organization's secured infrastructure, offering the benefits of independence and privacy simultaneously.

In some implementations, there may be adaptive scan orchestration, in which the ASPM service dynamically adjusts which of SAST, DAST, or SCA techniques to prioritize based on the characteristics of the software component. For example, components with many open-source dependencies may invoke extended SCA scans first, whereas critical transaction modules might trigger deeper DAST analysis. A scheduling engine within the ASPM service uses heuristics or metadata from the build system to determine optimal sequencing. As such, this adaptive workflow reduces redundant analysis and optimizes resource allocation while maintaining the rigor of full compliance testing, enabling faster yet complete certification cycles.

In some implementations, security process 110 may prevent 318 modification of scan depth, rule selection, and severity thresholds of the one or more security scans. For instance, once the security scans are ready to run, security process 110 ensures that the configuration parameters of those scans cannot be changed by the vendor or developer. In the certification workflow, this safeguard guarantees that every software component is tested under the same objective conditions, and no user can shorten a scan, remove categories of vulnerabilities, or lower severity thresholds to achieve a more favorable report. Security process 110 enforces this by, e.g., locking the parameters defined in the imported industry-standard profile so that they are read-only throughout the scanning phase. As seen in FIG. 6, the policy source component defines these constraints, and the workflow management system ensures they are upheld during execution. This design introduces a layer of impartiality and trust into the certification process, giving customers confidence that the results reflect the same rigorous criteria for all vendors.

For example, in some implementations, the scanning configuration file generated from the imported OWASP or NIST profile is stored in an encrypted, signed format within the policy source. When the scanning engine initializes, it verifies the digital signature to confirm that no changes have been made since the profile's creation. The file defines immutable parameters such as scan depth (for example, the number of code layers to traverse), rule selection (for instance, which vulnerability categories to include), and severity thresholds (for example, high, medium, and low classification levels). Attempts by a user to alter these parameters trigger an exception and are logged to the system of record for audit purposes. The scanning engine executes strictly within those verified parameters, ensuring tamper resistance and uniformity across all certification runs, eliminating human manipulation that could invalidate compliance results.

In some implementations, these restrictions are enforced through a policy enforcement gateway positioned between the CI/CD orchestration layer and the scanning services. The gateway intercepts all scan initialization requests, compares the incoming configuration parameters against the stored industry-standard profile, and blocks any request that deviates from the approved settings. The gateway operates using a digitally signed configuration manifest, refreshed from policy the source periodically. This network-layer control provides real-time enforcement even in distributed or multi-vendor environments, ensuring consistency across multiple teams or organizations using different scanning tools.

In some implementations, security process 110 embeds rule immutability at the engine level. Here, the scanning software itself is compiled to read its operational parameters only from a secure configuration service and disallow run-time overrides. The executable is cryptographically signed, and checksum verification occurs at launch to ensure no binary-level alteration. Once initialized, the service can only read configurations from the preapproved policy endpoint. The engine-level immutability removes the need for external monitoring and provides the strongest assurance that scans are executed precisely as defined by the certified security profiles.

In some implementations, security process 110 may determine 306 that the one or more vulnerabilities that exceeds a remediation threshold has been remediated, and in some implementations, security process 110 may perform 322 repeated scans of the software component until all vulnerabilities of the one or more vulnerabilities exceeding the remediation threshold are eliminated prior to enabling generation of the certification report, such that security process 110 may schedule 320 periodic rescans of previously certified software components at defined intervals to maintain compliance. For instance, after executing the scans, security process 110 reviews the results to determine whether any identified vulnerabilities exceed an established remediation threshold, typically defined in the industry-standard security profile. For example, the threshold may specify that all high and critical vulnerabilities must be remediated before a software component can qualify for certification. If such vulnerabilities remain, security process 110 automatically triggers one or more additional scans, repeating this cycle until those issues are resolved. This ensures that certification is never issued prematurely or while serious risks remain. Once the component is certified, the process does not end, as security process 110 may also schedule periodic rescans (e.g., monthly, quarterly, or based on policy) to ensure continued compliance over time. This ongoing verification integrates with the workflow management system and system of record to maintain an up-to-date compliance history for every released component within an application.

For example, in some implementations, security process 110 includes a remediation evaluation engine that consumes the vulnerability report from the scanning phase. The engine references the imported profile's defined thresholds (for example, all "critical" issues must be resolved, "high" issues must be reduced below a specified severity score). If unresolved vulnerabilities exceed the threshold, the engine automatically updates the build's status in the system of record to "noncompliant." It then re-queues the component for rescanning after developers apply fixes, ensuring a closed-loop workflow. When a new scan is completed, the engine performs a delta comparison between the latest and previous results to verify that previously critical findings have been eliminated. After all items above the remediation threshold are cleared, the status updates to "certified." The same mechanism triggers scheduled rescans at pre-set intervals, automatically revalidating components already in production. This continuous feedback loop enforces objective remediation standards and maintains long-term compliance without manual oversight, reducing risk of deploying insecure or degraded code.

In some implementations, security process 110 may include a policy-driven scheduler embedded in the ASPM layer that manages recurring scans. It uses calendar-based triggers (for example, every 30 days) or event-based triggers (for instance, when a dependent library changes or a new vulnerability disclosure occurs). The scheduler checks the software component's certification date and initiates a full re-evaluation through the same immutable scanning profile. A historical record of each re-scan result is appended to the compliance log stored in the system of record, enabling trend analysis over time. This automated scheduling model allows organizations to demonstrate sustained adherence to security standards and provides regulators or customers with verifiable evidence of ongoing security diligence.

In some implementations, security process 110 includes adaptive rescanning intelligence, where the frequency of rescans is dynamically adjusted based on prior scan outcomes and operational risk factors. For example, components with repeated vulnerabilities or high code churn may be rescanned weekly, while stable modules with consistent clean reports may be rescanned quarterly. A risk assessment module of security process 110 analyzes version history, vulnerability recurrence, and dependency freshness to determine the optimal scan interval. The adaptive rescanning optimizes resource utilization while maintaining high assurance levels, focusing scanning capacity where the likelihood of reintroduction of vulnerabilities is greatest.

In some implementations, security process 110 may generate 308 a certification report that includes a sanitized summary of the one or more security-scans results that omits source code, configuration data, and raw vulnerability details from results of the one or more security scan in response to determining that the one or more vulnerabilities that exceeds the remediation threshold has been remediated. For instance, once security process 110 confirms that all vulnerabilities exceeding the remediation threshold have been resolved, security process 110 prepares a certification report that summarizes the results in a controlled and standardized way. This report serves as the vendor's formal proof of compliance with the industry-standard security profile. The term sanitized summary generally refers to a carefully filtered version of the scan results, that are comprehensive enough to demonstrate that testing was performed and that critical issues were addressed, but devoid of any information that could expose the vendor's proprietary software or internal environment. Specifically, security process 110 identifies, removes or masks elements such as source code excerpts, configuration parameters, and raw vulnerability identifiers before the report is finalized, or prevents them from being included in the report in the first place. These items, if shared, could reveal sensitive intellectual property or provide potential attackers with insight into exploitable weaknesses. The sanitization step thus ensures transparency and accountability without jeopardizing code security or confidentiality. The compliance summary may be stored in the system of record, shown in FIG. 6.

For example, in some implementations, the certification report is generated by a report composition engine of security process 110 that operates on the results database produced by the security scans. As shown in the example implementation of FIG. 7, certification report 700 for each raw scan result may include a structured data record containing fields such as file path, code snippet, line number, rule violated, severity score, and remediation notes. The report engine of security process 110 applies a sanitization filter, which uses a combination of pattern recognition and metadata classification rules to identify and exclude certain fields or redact sensitive information. For example, any field containing text derived directly from the application's source code or configuration files identified by file extensions (e.g., .py, .js, .yaml, .env), variable syntax (e.g., "db_password="), or code structure markers, is removed or replaced with a neutral placeholder such as "[REDACTED SOURCE REFERENCE]." Likewise, raw vulnerability details such as stack traces, exploit payloads, or specific function calls are omitted. The resulting report aggregates vulnerability counts by category (e.g., authentication flaws, injection risks, cryptographic weaknesses) and by severity level, presenting only summarized metrics, remediation completion status, and the final pass/fail certification outcome. This approach provides a verifiable yet non-intrusive compliance artifact that customers can review confidently while ensuring that no sensitive implementation data escapes the vendor's secure environment.

In some implementations, sanitization occurs through a data classification and policy enforcement module of security process 110 that uses machine learning models trained on historical vulnerability reports. The module automatically classifies each data element as public, restricted, or confidential based on its content and context. Source code fragments are identified through linguistic patterns such as syntax tokens, indentation structures, or language-specific keywords. Configuration data are detected by the presence of parameter-value pairs commonly used for environment variables, API keys, or network addresses. Raw vulnerability details are identified by references to specific exploit identifiers (e.g., CVE-IDs) or stack traces containing function names and memory addresses. The module automatically strips or anonymizes all "confidential" content before generating the report. The sanitized report is then formatted into a standardized compliance document that includes charts, severity histograms, and a summary compliance score. This intelligent filtering approach reduces the risk of human error in identifying sensitive data and scales effectively across large codebases or multi-project environments.

In some implementations, security process 110 includes a cryptographic sanitization pipelines in which the sensitive raw scan results are retained only within a protected enclave, and the report generator accesses only hashed or pseudonymized summaries. For example, individual vulnerabilities may be represented by unique non-reversible identifiers derived from hashing the file path and finding type. The certification report then references only these identifiers, ensuring traceability without disclosure of underlying technical content. The report can include digital attestations confirming that all "critical" and "high" vulnerabilities (as defined by the imported OWASP/NIST profile) have been remediated, without revealing the exact code segments involved. Cryptographic anonymization ensures full confidentiality of vendor source code and configuration data while allowing customers or regulators to independently verify that certification results are authentic and unaltered.

In some implementations, security process 110 supports context-aware redaction templates. Each industry-standard profile defines which categories of information are considered sensitive for its associated scans. For instance, an OWASP-based profile may classify session tokens, query strings, or encryption keys as redaction targets, while a NIST SSDF-based profile may include system architecture files and deployment scripts. The report generator cross-references these redaction rules during report assembly, ensuring framework-specific compliance. As a result, it ensures alignment between the sanitization process and the security principles embodied by the underlying framework, offering precise and standards-driven data protection within the certification artifact.

In some implementations, generating the certification report may include generating 324 the certification report automatically based upon successful completion of a build stage in a continuous integration/continuous delivery (CI/CD) pipeline. For instance, after all vulnerabilities above the remediation threshold have been cleared, security process 110 can automatically generate the certification report as part of the normal software delivery process, without human intervention. Within the CI/CD pipeline, each build moves through distinct stages such as compilation, testing, and deployment. When the build reaches the final stage and passes all automated quality and security gates, the pipeline triggers the certification process. Security process 110 then compiles the sanitized scan results into the certification report, which may then be sent to the customer. This automation ensures that certification occurs consistently, immediately after successful verification, and eliminates the possibility of skipping the security certification step before release.

For example, in some implementations, the CI/CD pipeline uses event-driven hooks to initiate report generation. Each stage of the pipeline emits structured status events (for example, "build_complete" or "test_passed") to an internal message broker. When a final "build_success" event occurs, the broker notifies security process 110 through a secure API call. The process retrieves the latest scan data, verifies that all remediation criteria are met, and generates the certification report automatically. This integration may use common automation frameworks such as YAML-based pipeline definitions or containerized runners, and the resulting certification report is stored as a digital artifact alongside other build outputs and can be published to the organization's compliance dashboard. This tight integration guarantees that no release candidate bypasses security certification and that the compliance evidence is created in real time, synchronized with each build, thereby improving both reliability and audit traceability.

In some implementations, the report generation is orchestrated through a pipeline plug-in or extension module embedded directly within the build orchestration tool of security process 110. The module monitors build status via internal APIs, and upon detecting a successful build, it spawns a lightweight report-generation job within the same environment. This job calls the certification engine, compiles sanitized summaries, and attaches the report automatically to the build metadata stored in the artifact repository. Each report is cryptographically signed and indexed for later retrieval. Embedding certification logic directly in the CI/CD tool simplifies deployment and provides end-to-end visibility from code commit to certified output, reducing configuration complexity and minimizing integration overhead.

In some implementations, security process 110 may include policy-based automation, where the organization defines in its governance policy that certification is a required "exit criterion" for the release pipeline. The CI/CD controller enforces this policy by automatically invoking security process 110's API when a pipeline reaches the release stage. If the certification report generation fails or the system detects unresolved vulnerabilities, the pipeline automatically halts deployment and alerts the responsible teams. Once compliance is confirmed, the system resumes deployment automatically. This policy-driven method ensures continuous enforcement of security governance rules and prevents non-compliant code from being released, combining automation with risk-based control.

In some implementations, generating the certification report may include outputting 326 a compliance score based on aggregate vulnerability severity and remediation completeness, where security process 110 may aggregate 328 a count of vulnerabilities grouped by severity level in the certification report. For instance, as part of generating the certification report, security process 110 produces a compliance score that quantifies the overall security posture of the scanned software component. This score provides an at-a-glance summary for customers or compliance officers, allowing them to quickly understand the degree of risk remaining after remediation. Security process 110 calculates this score by analyzing all vulnerabilities identified during scanning, weighting each by its severity and factoring in whether it was successfully remediated. Security process 110 also aggregates vulnerability counts by severity level, typically classified as Critical, High, Medium, and Low, and includes these totals in the certification report alongside visual summaries or tables, such as the example shown in FIG. 7. The combination of severity aggregation and remediation completeness enables security process 110 to deliver both transparency and a measurable indicator of software health, making it easier for stakeholders to assess readiness for deployment or procurement.

For example, In some implementations, the compliance score is computed through a weighted severity model. Security process 110 assigns numeric weights to each severity level (for instance, 10 points for Critical, 5 for High, 3 for Medium, and 1 for Low). After scanning, the system multiplies each severity count by its corresponding weight, sums the results, and normalizes them against the total number of vulnerabilities identified. The engine then applies a remediation factor, reducing the weighted total based on the proportion of vulnerabilities successfully resolved. The final compliance score may range from 0 to 100, where higher scores represent stronger compliance with the predefined security profile. In the certification report, this score is displayed alongside tables summarizing vulnerabilities by severity and by category (e.g., authentication, encryption, injection). The quantitative scoring enables objective comparisons between software components, simplifies risk communication for non-technical reviewers, and creates a repeatable metric aligned with OWASP and NIST scoring methodologies.

In some implementations, the compliance score is derived using a machine learning regression model trained on historical scan data. The model considers not only severity and remediation completeness but also contextual factors such as the type of component, size of the codebase, and the criticality of affected modules, producing a predicted risk exposure score, which is then translated into a compliance rating (e.g., "Excellent," "Satisfactory," or "Needs Improvement"). The aggregated vulnerability counts are still included in the report for transparency, but the score reflects a data-driven evaluation of the software's overall security posture. Adaptive intelligence allows the scoring to evolve as the system learns from historical patterns, leading to more accurate risk assessment and prioritization over time.

In some implementations, security process 110 integrates the compliance score with a dashboard visualization layer. In this implementation, the report generator produces both a PDF-style certification report and an interactive dashboard accessible through a secure portal. The dashboard displays real-time charts showing vulnerability distribution by severity, remediation trends over time, and the computed compliance score for each release. The scoring algorithm may follow a weighted average model or a normalized risk index derived from NIST Common Vulnerability Scoring System (CVSS) values. This more visual, data-driven reporting method enhances user comprehension and supports executive-level decision-making by converting raw security findings into accessible business metrics.

In some implementations, security process 110 allows profile-specific scoring models. For example, when using an OWASP ASVS-based profile, the score may emphasize application-layer risks such as injection or authentication weaknesses, while under a NIST SSDF-based profile, the score may factor in procedural aspects such as secure configuration or change management compliance. Security process 110 may automatically apply the scoring formula associated with the selected profile.

In some implementations, security process 110 may digitally sign 330 the certification report using a cryptographic key to authenticate origin and integrity of the certification report, may format 332 the certification report as an independent vendor-attestation letter identifying a scanning vendor, the secure-development standard, and a timestamp of completion, and may store 334 the certification report in an immutable ledger to prevent alteration. For instance, once the certification report has been generated and the compliance score calculated, security process 110 finalizes the document by applying a digital signature that verifies its authenticity and integrity. The signature ensures that the report cannot be altered without detection after it is issued. In practice, this makes the certification report function as a verifiable attestation letter, providing customers with confidence that the report originated from a trusted scanning process and that its contents reflect the original verified results. The formatted attestation letter typically identifies the scanning vendor or ASPM service that performed the scans, specifies the secure-development framework applied (such as OWASP or NIST SSDF), and includes a precise timestamp marking the completion of the certified build. This output can be presented to customers or compliance auditors as official proof that the vendor's software has passed standardized security validation.

For example, in some implementations, the digital signature module within security process 110 uses asymmetric cryptography to sign the final certification report. Security process 110 employs a public-key infrastructure (PKI) where a private key held by the trusted scanning authority generates a signature over a secure hash of the report's contents (for example, using SHA-256). The corresponding public key is published as part of the certification framework so that customers or auditors can verify the signature. During signing, the module also embeds metadata such as the vendor's organization ID, the scanning vendor's certificate ID, the applicable profile (e.g., OWASP ASVS v4.0), and the timestamp of report generation. The attestation letter produced is typically exported in a tamper-evident format such as PDF/A or digitally signed JSON, which includes a visible signature block reading "Digitally Signed by Security Process 110."

In some implementations, the digital signing process is handled by a hardware-backed security module (HSM) or trusted platform module (TPM) integrated with the ASPM infrastructure. Here, the report hash is sent to the HSM, which uses its protected signing key to generate a signature that cannot be extracted or duplicated in software. The resulting attestation letter is formatted using a standardized digital certificate template containing fields for scanning vendor name, secure-development standard, timestamp, and a certificate serial number, where the entire document is then encapsulated in a signed container that can be verified using any industry-standard signature-validation utility.

In some implementations, security process 110 uses blockchain-anchored verification. After the report is generated, its cryptographic hash is recorded on a distributed ledger managed by multiple independent nodes. The vendor-attestation letter includes a reference transaction ID and timestamp, enabling any customer to confirm the report's authenticity by checking the blockchain entry, and the report itself remains private, but the immutable ledger entry guarantees that its original hash and creation time cannot be altered.

In some implementations, security process 110 allows the attestation letter formatting service to adapt its presentation depending on the customer's requirements or jurisdiction. For instance, government customers might require an attestation formatted under NIST's Secure Software Development Framework citation style, while commercial customers might prefer a concise OWASP-compliant summary. The formatting module of security process 110 automatically populates the vendor name, scanning vendor, framework reference, timestamp, and compliance score into the correct template, appending the digital signature at the end.

In some implementations, security process 110 may transmit 310 the certification report with the sanitized summary to the customer to evidence compliance of the software component with the predefined industry-standard security profile. For instance, once the certification report has been digitally signed and recorded in the immutable ledger, security process 110 can securely transmit the completed document to the customer as formal evidence that the vendor's software complies with the selected OWASP- or NIST-based security profile. This transmission may occur after the build has passed all verification stages and the certification report has been confirmed as authentic. The report provided to the customer includes the sanitized summary, compliance score, and attestation details, but, importantly, excludes any sensitive or proprietary information. In practice, the customer receives a clear, standardized certification artifact showing that the software was independently scanned, all high-severity issues were remediated, and the process was verified according to immutable security standards. This automated handoff replaces traditional manual audit exchanges or subjective vendor assurances with an objective, verifiable proof of compliance, all without divulging sensitive information.

For example, in some implementations, security process 110 transmits the certification report via a secure file transfer protocol (SFTP) or encrypted API endpoint. The report is encapsulated in a digitally signed container, and the transmission uses TLS encryption to prevent interception or tampering in transit, and each transmission event is logged in the system of record with metadata such as recipient identifier, timestamp, and delivery status. The customer's compliance system or procurement portal may automatically ingest the report and verify its digital signature using the public key associated with the scanning authority. If the verification passes, the report is marked "Accepted," confirming that the vendor's component meets the required security criteria.

In some implementations, the report is transmitted through a secure customer-access portal managed by the scanning service. Customers log into the portal using multifactor authentication and can view or download reports for all software components provided by approved vendors so each report includes a visible digital signature block, the compliance score, a summary table of vulnerabilities by severity, and the attestation details (scanning vendor, standard used, and timestamp). Reports are tagged by component name and version, allowing customers to maintain a continuous compliance record over time.

In some implementations, security process 110 employs automated integration with customer compliance management systems (CMS). Here, security process 110 uses an API-to-API connection to push the sanitized certification report directly into the customer's compliance repository. The transmitted payload is formatted in a standardized schema such as JSON or XML, ensuring compatibility with various CMS platforms, and each record includes metadata fields identifying the applicable industry-standard profile, compliance score, and immutable ledger reference.

In some implementations, the report transmission leverages a document notarization network that distributes the signed certification report to multiple independent verification nodes. Customers receive both the report and a notarization receipt confirming that the document matches the hash recorded in the ledger, where the transmission occurs over a secure channel, and any subsequent alteration of the report would invalidate the notarization receipt.

In some implementations, security process 110 may receive 336 a contractual requirement from the customer specifying that delivery of the software component is contingent upon receipt of the certification report. For instance, before development even begins, many customers, particularly in regulated industries, require that any software they purchase meet certain security assurance standards. In these scenarios, security process 110 receives and enforces a contractual requirement specifying that the vendor must provide a valid certification report before the software can be accepted or deployed. This requirement becomes a formal condition of delivery, ensuring that the certification process is not optional but a mandated compliance checkpoint. Within the workflow described throughout, this requirement is stored in the system of record and tied to the specific project, so that when the CI/CD pipeline reaches the deployment phase, it automatically checks whether the corresponding certification report has been received and verified. Only after the report is validated, demonstrating compliance with the OWASP or NIST-based security profile, can the software component be released to the customer. This contractual enforcement transforms security certification from a best practice into a binding quality control gate that ensures accountability between vendors and customers.

For example, In some implementations, security process 110 integrates with a contract management system (CMS) or procurement portal used by the customer. During project initiation, the CMS transmits a structured compliance requirement object to security process 110 via a secure API. This object specifies delivery conditions such as "Certification report required: Yes," along with the applicable security standard (for example, "OWASP ASVS v4.0" or "NIST SSDF Rev.1"). When the vendor later attempts to deliver the software artifact through the CI/CD pipeline, the pipeline queries the CMS through the same API. If no verified certification report is found for that version of the software, the pipeline automatically halts deployment and flags the release as "Pending Compliance." Once the signed report is transmitted and validated, the pipeline updates the status to "Compliant" and continues delivery. This implementation ensures strict contractual enforcement at the system level, eliminating the possibility of human oversight and guaranteeing that compliance obligations are automatically verified before release.

In some implementations, the contractual requirement is embedded directly in a machine-readable service-level agreement (SLA) policy stored within security process 110. Each SLA policy contains a set of compliance rules written in a declarative format (for example, JSON or YAML). When the vendor initiates software delivery, the security process references this policy to determine whether certification is required, so if the policy specifies a certification prerequisite, security process 110 validates the existence and authenticity of the corresponding report by checking its ledger record and digital signature. If validation fails, delivery is blocked, and a notice is automatically sent to both vendor and customer representatives.

In some implementations, security process 110 applies smart contract automation for cloud-based or distributed development ecosystems. Here, the contractual requirement is represented as a smart contract deployed on a permissioned blockchain network shared by vendors and customers. The smart contract encodes the condition that delivery cannot proceed until a valid certification hash matching a specific vendor and build identifier is written to the ledger. Once the certification is verified, the smart contract automatically releases access credentials or decryption keys that allow the customer to retrieve the software package. This blockchain-based enforcement provides cryptographic certainty that delivery obligations are met exactly as written, reducing administrative friction and preventing unverified code from reaching production.

In some implementations, for environments with multiple suppliers, the contractual requirement is managed through a vendor compliance registry. Each vendor's profile in the registry includes its certification obligations and delivery prerequisites. When software is submitted for customer acceptance, the registry validates that the vendor's active certification is up to date and matches the software version being delivered. Noncompliant submissions are automatically rejected or quarantined until a valid certification report is uploaded. This centralized vendor compliance registries simplify oversight for customers working with numerous suppliers, ensuring that every delivered component meets the same standardized security conditions.

In some implementations, security process 110 may associate 338 each certification report with a unique software bill of materials (SBOM) for each corresponding software component. For instance, each certification report produced by security process 110 can be linked to a Software Bill of Materials (SBOM) that uniquely describes the composition of the certified software component. An SBOM functions like an ingredient list, detailing every library, dependency, module, and third-party component included in a software build. By associating the certification report with its corresponding SBOM, the system ensures that the report's validity applies only to the specific version and configuration of software that was scanned and certified. This linkage also allows customers to trace compliance results down to the component level, if a future vulnerability is discovered in one of the open-source libraries listed in the SBOM, the customer can immediately determine whether the affected component was part of a previously certified build. This association between the certification report and SBOM enhances traceability, lifecycle security, and long-term accountability for every certified software release.

For instance, in some implementations, security process 110 generates or imports an SBOM in a standardized format such as SPDX (Software Package Data Exchange) or CycloneDX during the build process. The SBOM, which may be stored in the system of record, includes detailed metadata for each dependency, component name, version, license type, and source repository, and is tagged with a unique identifier corresponding to the build number or commit hash. When the certification report is created, the system embeds a cross-reference field linking the report's unique ID to the SBOM identifier. This linkage is recorded in the system of record and the immutable ledger so that the certification cannot be mistakenly applied to a modified or repackaged version of the software. The combined dataset allows a compliance officer or customer to verify that the certified code exactly matches the materials and dependencies described in the SBOM.

In some implementations, the association between certification reports and SBOMs is handled by a dependency-tracking service embedded within the ASPM framework. Each SBOM entry is fingerprinted using a cryptographic hash of the dependency's binary or source artifact. When the certification report is finalized, the system computes an aggregate hash of the entire SBOM and embeds that hash in the report header. During verification, the system recalculates the hash from the actual deployed software to confirm it matches the one stored in the certification record.

In some implementations, security process 110 extends the SBOM linkage through continuous dependency monitoring. After certification, security process 110 periodically rechecks all components listed in each SBOM against external vulnerability feeds (e.g., CVE databases). If a new vulnerability emerges affecting one of those dependencies, the system automatically flags the associated certification as "under review" and notifies both the vendor and the customer. A new scan is then scheduled to verify remediation and reissue certification if necessary.

In some implementations, security process 110 integrates SBOM-certificate associations into a visual compliance dashboard accessible through the vendor portal. Each software component is listed alongside its SBOM details, certification date, compliance score, and attestation hash. Users can expand a component entry to view the full SBOM hierarchy and trace which third-party libraries were included at the time of certification. This visualization allows rapid impact analysis when external security advisories are issued.

In some implementations, security process 110 may operate 340 as a third-party certification service accessible to multiple independent software vendors, and security process 110 may enforce 342 the execution of the one or more security scans before permitting deployment of the software component to a production environment. For instance, security process 110 functions not as an internal enterprise tool but as an independent, third-party certification service that multiple software vendors can subscribe to or integrate with. Acting as a neutral authority, this service applies the same industry-standard OWASP and NIST-based profiles to all participating vendors, ensuring consistent evaluation and trustworthy certification across the market. Each vendor's CI/CD pipeline connects to the certification service to perform the required scans and generate compliance reports prior to release. Importantly, the system enforces strict pre-deployment verification, meaning that no software component can advance to production until it has successfully passed the mandated scans and received a valid certification report. The certification service of security process 110 may sit between the vendors' development infrastructure and their deployment environments, serving as both a gatekeeper and a certifying body. This model not only provides customers with impartial verification of security posture but also establishes an industry ecosystem of standardized software compliance, reducing redundant audit processes and increasing mutual trust among suppliers, customers, and regulators.

For example, in some implementations, security process 110 is hosted on a multi-tenant cloud platform that provides certification services to multiple independent software vendors (ISVs). Each vendor registers with the service and is assigned an isolated tenant space with access to APIs for submitting builds or triggering scans. When a vendor's CI/CD pipeline attempts to deploy code, it first issues a certification request to the platform. The certification service executes the necessary scans using the predefined OWASP or NIST profiles, verifies that all remediation thresholds have been met, and issues a digital certification token tied to that build. The vendor's deployment pipeline is configured to check for a valid token before deploying to production. If the certification token is missing, expired, or invalid, deployment halts automatically.

In some implementations, security process 110 is implemented as a federated certification network distributed across regional data centers. Each node of the network operates under a shared policy framework, ensuring uniform enforcement of scanning standards globally. Vendors interact with their nearest regional node through encrypted APIs. Upon certification, results are synchronized across all nodes to maintain a unified global ledger of certified builds. Each vendor's CI/CD system uses a webhook or API callback that verifies certification status prior to release.

In some implementations, security process 110 introduces an on-premises certification proxy for vendors requiring local control. In this model, vendors deploy a lightweight proxy service that communicates with the centralized certification platform. The proxy executes initial pre-scan validations and relays encrypted scan data to the third-party service for certification. The enforcement logic remains consistent: production deployment cannot proceed unless the proxy confirms receipt of a valid certification token.

In some implementations, security process 110 supports continuous enforcement integration with cloud hosting providers or container orchestration platforms. Here, the certification service links directly with production control systems such as deployment orchestrators, image registries, or runtime policy engines. When a vendor attempts to deploy a container or virtual machine image, the orchestrator queries the certification service to confirm whether the image hash corresponds to a certified build. Only certified images are permitted to launch; uncertified builds are quarantined or deleted automatically. Runtime enforcement ensures that only verified, certified software operates in production environments, closing the gap between development assurance and operational security.

The terminology used herein is for the purpose of describing particular implementations only and is not intended to be limiting of the disclosure. As used herein, the singular forms "a", "an" and "the" are intended to include the plural forms as well, including any steps performed by a/the computer/processor, unless the context clearly indicates otherwise. As used herein, the phrase "at least one of A, B, and C" should be construed to mean a logical (A OR B OR C), using a non-exclusive logical OR, and should not be construed to mean "at least one of A, at least one of B, and at least one of C." As another example, the language "at least one of A and B" (and the like) as well as "at least one of A or B" (and the like) should be interpreted as covering only A, only B, or both A and B, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof. Example sizes/models/values/ranges can have been given, although examples are not limited to the same.

The terms (and those similar to) "coupled," "attached," "connected," "adjoining," "transmitting," "communicating," "receiving," "connected," "engaged," "adjacent," "next to," "on top of," "above," "below," "abutting," and "disposed," used herein is to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action is to occur, either in a direct or indirect manner. The term "set" does not necessarily exclude the empty set—in other words, in some circumstances a "set" may have zero elements. The term "non-empty set" may be used to indicate exclusion of the empty set—that is, a non-empty set must have one or more elements, but this term need not be specifically used. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

The corresponding structures, materials, acts, and equivalents (e.g., of all means or step plus function elements) that may be in the claims below are intended to include any structure, material, or act for performing the function in combination with other claimed elements as specifically claimed. While the disclosure describes structures corresponding to claimed elements, those elements do not necessarily invoke a means plus function interpretation unless they explicitly use the signifier "means for." Unless otherwise indicated, recitations of ranges of values are merely intended to serve as a shorthand way of referring individually to each separate value falling within the range, and each separate value is hereby incorporated into the specification as if it were individually recited. While the drawings divide elements of the disclosure into different functional blocks or action blocks, these divisions are for illustration only. According to the principles of the present disclosure, functionality can be combined in other ways such that some or all functionality from multiple separately-depicted blocks can be implemented in a single functional block; similarly, functionality depicted in a single block may be separated into multiple blocks. Unless explicitly stated as mutually exclusive, features depicted in different drawings can be combined consistent with the principles of the present disclosure. Moreover, although this disclosure describes and depicts respective implementations herein as including particular components, elements, feature, functions, operations, or steps (and arrangements thereof), any of these implementations may include any combination, arrangement, or permutation of any of the components, elements, features, functions, operations, or steps described or depicted any-where herein that a person having ordinary skill in the art would comprehend after reading the present disclosure. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The description of the present disclosure has been presented for purposes of illustration and description but is not intended to be exhaustive or limited to the disclosure in the form disclosed. After reading the present disclosure, many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated. The features of any dependent claim may be combined with the features of any of the independent claims or other dependent claims.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method, comprising:
   receiving, by a computing device, an indication that a software component is to be released for delivery to a customer;
   selecting a predefined and non-modifiable industry-standard security profile defining one or more security scans to be executed in accordance with at least one of an application-security framework and a secure-development standard;
   executing the one or more security scans against the software component using the predefined and non-modifiable industry-standard security profile to identify one or more vulnerabilities;
   determining that the one or more vulnerabilities that exceeds a remediation threshold has been remediated;
   generating, by applying a sanitization operation to a result of the one or more security scans to exclude at least one of source code, configuration data, and raw vulnerability details from inclusion, a certification report that includes a sanitized summary of the result of the one or more security-scans that omits the source code, the configuration data, and the raw vulnerability details from results of the one or more security scan in response to determining that the one or more vulnerabilities that exceeds the remediation threshold has been remediated; and
   transmitting the certification report with the sanitized summary to the customer to evidence compliance of the software component with the predefined industry-standard security profile.

2. The method of claim 1, wherein the predefined industry-standard security profile is based on at least one of Open Web Application Security Project (OWASP) framework and National Institute of Standards and Technology (NIST) Secure Software Development Framework (SSDF).

3. The method of claim 1, further comprising aggregating, in the certification report, a count of vulnerabilities grouped by severity level.

4. The method of claim 1, further comprising digitally signing the certification report using a cryptographic key to authenticate origin and integrity of the certification report.

5. The method of claim 1, wherein executing the one or more security scans comprises invoking a third-party Application Security Posture Management (ASPM) service that enforces the industry-standard security profile.

6. The method of claim 1, further comprising preventing modification of scan depth, rule selection, and severity thresholds of the one or more security scans.

7. The method of claim 1, further comprising performing repeated scans of the software component until all vulnerabilities of the one or more vulnerabilities exceeding the remediation threshold are eliminated prior to enabling generation of the certification report.

8. The method of claim 1, further comprising formatting the certification report as an independent vendor-attestation letter identifying a scanning vendor, the secure-development standard, and a timestamp of completion.

9. The method of claim 1, further comprising storing the certification report in an immutable ledger to prevent alteration.

10. The method of claim 1, wherein generating the certification report includes generating the certification report automatically based upon successful completion of a build stage in a continuous integration/continuous delivery (CI/CD) pipeline.

11. The method of claim 1, further comprising receiving a contractual requirement from the customer specifying that delivery of the software component is contingent upon receipt of the certification report.

12. The method of claim 1, wherein executing the one or more security scans includes performing the one or more security scans using one of static application security testing (SAST), dynamic application security testing (DAST), and software composition analysis (SCA) techniques.

13. The method of claim 1, further comprising associating each certification report with a unique software bill of materials (SBOM) for each corresponding software component.

14. The method of claim 1, further comprising scheduling periodic rescans of previously certified software components at defined intervals to maintain compliance.

15. The method of claim 1, further comprising operating as a third-party certification service accessible to multiple independent software vendors.

16. The method of claim 1, further comprising automatically importing the industry-standard security profiles from one of a network source hosting current OWASP and NIST control definitions.

17. The method of claim 1, wherein generating the certification report includes outputting a compliance score based on aggregate vulnerability severity and remediation completeness.

18. The method of claim 1, further comprising enforcing the execution of the one or more security scans before permitting deployment of the software component to a production environment.

19. A computer program product residing on a computer readable storage medium having a plurality of instructions stored thereon which, when executed across one or more processors, causes at least a portion of the one or more processors to perform operations comprising:

receiving, by a computing device, an indication that a software component is to be released for delivery to a customer;

selecting a predefined and non-modifiable industry-standard security profile defining one or more security scans to be executed in accordance with at least one of an application-security framework and a secure-development standard;

executing the one or more security scans against the software component using the predefined and non-modifiable industry-standard security profile to identify one or more vulnerabilities;

determining that the one or more vulnerabilities that exceeds a remediation threshold has been remediated;

generating, by applying a sanitization operation to a result of the one or more security scans to exclude at least one of source code, configuration data, and raw vulnerability details from inclusion, a certification report that includes a sanitized summary of a result of the one or more security-scans that omits source code, configuration data, and raw vulnerability details from results of the one or more security scan in response to determining that the one or more vulnerabilities that exceeds the remediation threshold has been remediated; and transmitting the certification report with the sanitized summary to the customer to evidence compliance of the software component with the predefined industry-standard security profile.

20. A computing system including one or more processors and one or more memories configured to perform operations comprising:

receiving, by a computing device, an indication that a software component is to be released for delivery to a customer;

selecting a predefined and non-modifiable industry-standard security profile defining one or more security scans to be executed in accordance with at least one of an application-security framework and a secure-development standard;

executing the one or more security scans against the software component using the predefined and non-modifiable industry-standard security profile to identify one or more vulnerabilities;

determining that the one or more vulnerabilities that exceeds a remediation threshold has been remediated;

generating, by applying a sanitization operation to a result of the one or more security scans to exclude at least one of source code, configuration data, and raw vulnerability details from inclusion, a certification report that includes a sanitized summary of a result of the one or more security-scans that omits source code, configuration data, and raw vulnerability details from results of the one or more security scan in response to determining that the one or more vulnerabilities that exceeds the remediation threshold has been remediated; and transmitting the certification report with the sanitized summary to the customer to evidence compliance of the software component with the predefined industry-standard security profile.

* * * * *